(12) United States Patent
Wu et al.

(10) Patent No.: US 12,704,689 B2
(45) Date of Patent: Aug. 11, 2026

(54) OPTICAL MODULE

(71) Applicant: HISENSE BROADBAND MULTIMEDIA TECHNOLOGIES CO., LTD., Qingdao (CN)

(72) Inventors: Tao Wu, Qingdao (CN); Shuang Jin, Qingdao (CN); Hongtu Pu, Qingdao (CN); Jianwei Mu, Qingdao (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 414 days.

(21) Appl. No.: 18/473,592

(22) Filed: Sep. 25, 2023

(65) Prior Publication Data

US 2024/0027705 A1 Jan. 25, 2024

Related U.S. Application Data

(63) Continuation of application No. PCT/CN2022/102079, filed on Jun. 28, 2022.

(30) Foreign Application Priority Data

Aug. 31, 2021 (CN) ......................... 202111012383.0
Aug. 31, 2021 (CN) ......................... 202111015461.2
(Continued)

(51) Int. Cl.
*G02B 6/42* (2006.01)

(52) U.S. Cl.
CPC ........... *G02B 6/4246* (2013.01); *G02B 6/428* (2013.01); *G02B 6/4286* (2013.01)

(58) Field of Classification Search
None
See application file for complete search history.

(56) References Cited

U.S. PATENT DOCUMENTS

2003/0152336 A1 8/2003 Gurevich et al.
2014/0233897 A1* 8/2014 Ishikawa ............. G02B 6/4292 385/93

(Continued)

FOREIGN PATENT DOCUMENTS

CN 204101771 U 1/2015
CN 108139556 A 6/2018
(Continued)

OTHER PUBLICATIONS

Chinese Notification of Grant of Invention Patent Rights dated Jun. 8, 2022 in corresponding Chinese Application No. 202111015876.X, translated, 7 pages.

(Continued)

*Primary Examiner* — Chris H Chu
(74) *Attorney, Agent, or Firm* — Cozen O'Connor

(57) ABSTRACT

An optical module includes an upper shell, a lower shell, a circuit board, and a light-emitting device. The circuit board includes a mounting hole running through a front surface and a back surface of the circuit board. The light-emitting device includes a base, a laser assembly, a translation prism, and an optical fiber coupler. The base is installed on the front surface and has an installation surface facing towards the front surface. The laser assembly and the translation prism are installed on the installation surface. The laser assembly passes through the mounting hole. The translation prism is configured to translate a laser beam located at the back side of the circuit board emitted by the laser assembly to the front side of the circuit board. The optical fiber coupler is configured to transmit the translated laser beam to outside of the optical module.

18 Claims, 13 Drawing Sheets

(30) Foreign Application Priority Data

| | | |
|---|---|---|
| Aug. 31, 2021 | (CN) | 202111015574.2 |
| Aug. 31, 2021 | (CN) | 202111015786.0 |
| Aug. 31, 2021 | (CN) | 202111015876.X |
| Aug. 31, 2021 | (CN) | 202122076596.1 |
| Aug. 31, 2021 | (CN) | 202122085677.8 |
| Aug. 31, 2021 | (CN) | 202122085678.2 |
| Aug. 31, 2021 | (CN) | 202122087754.3 |
| Aug. 31, 2021 | (CN) | 202122087755.8 |

(56) References Cited

U.S. PATENT DOCUMENTS

| | | | | |
|---|---|---|---|---|
| 2016/0116695 | A1 * | 4/2016 | Nekado | G02B 6/4249 385/14 |
| 2017/0075079 | A1 | 3/2017 | Lin et al. | |
| 2020/0408993 | A1 | 12/2020 | Nakayama et al. | |

FOREIGN PATENT DOCUMENTS

| | | | | | |
|---|---|---|---|---|---|
| CN | 110531471 | A | * | 12/2019 | G02B 6/4214 |
| CN | 110954999 | A | | 4/2020 | |
| CN | 111313969 | A | | 6/2020 | |
| CN | 111338039 | A | | 6/2020 | |
| CN | 111708130 | A | | 9/2020 | |
| CN | 212083738 | U | | 12/2020 | |
| CN | 212083740 | U | | 12/2020 | |
| CN | 212160161 | U | | 12/2020 | |
| CN | 112180522 | A | | 1/2021 | |
| CN | 112346181 | A | | 2/2021 | |
| CN | 213302589 | U | | 5/2021 | |
| CN | 112929092 | A | | 6/2021 | |
| CN | 112965190 | A | | 6/2021 | |
| CN | 113219601 | A | | 8/2021 | |
| CN | 113721331 | A | | 11/2021 | |
| CN | 215641964 | U | | 1/2022 | |
| CN | 215895035 | U | | 2/2022 | |
| CN | 215895036 | U | | 2/2022 | |
| CN | 216013740 | U | | 3/2022 | |
| CN | 115016074 | A | * | 9/2022 | G02B 6/428 |
| JP | 2009265677 | A | * | 11/2009 | G02B 6/42 |
| WO | 2021115129 | A1 | | 6/2021 | |

OTHER PUBLICATIONS

International Search Report and Written Opinion dated Sep. 28, 2022 in corresponding International Application No. PCT/CN2022/102079, translated, 20 pages.

Chinese Notification of the First Office Action mailed Nov. 26, 2024 in corresponding Chinese Application No. 202111012383.0, translated, 15 pages.

Chinese Notification of the Second Office Action mailed Sep. 29, 2024 in corresponding Chinese Application No. 202111015574.2, translated, 14 pages.

Chinese First Office Action dated Mar. 29, 2024 in corresponding Chinese Application No. 202111015574.2, translated, 16 pages.

* cited by examiner 4141
4140
4141
4140
410
4120
4110
4111
4151
4151
4130
4150

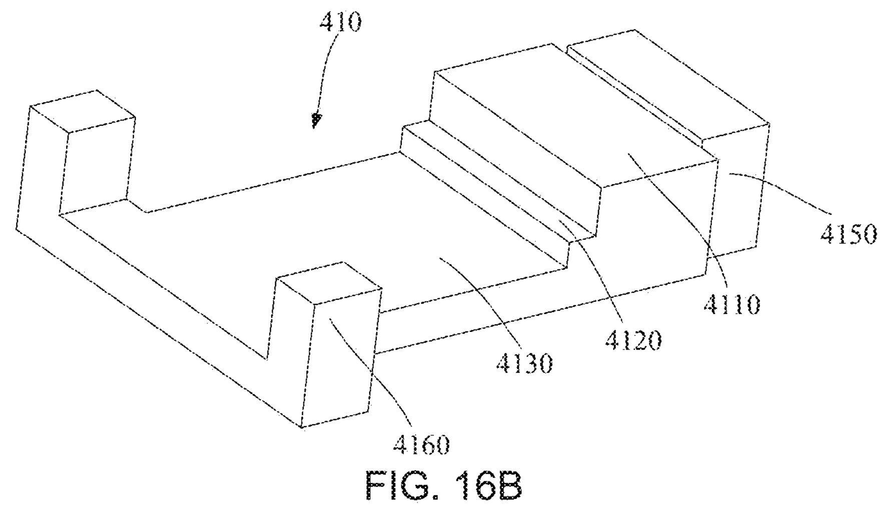
FIG. 16B
4710
4610
4510
440
430
420
4720
4151
4170
4620
4520
4150
FIG. 17A
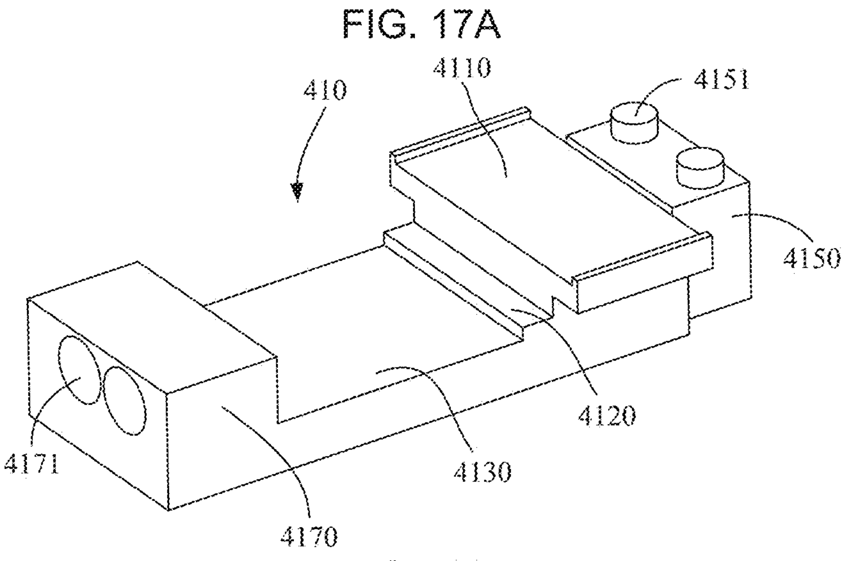
FIG. 17B

OPTICAL MODULE

CROSS-REFERENCE TO RELATED APPLICATIONS

This application is a continuation application of International Patent Application No. PCT/CN2022/102079, filed on Jun. 28, 2022, which claims priority to Chinese Patent Application No. 202111012383.0, filed on Aug. 31, 2021, Chinese Patent Application No. 202111015876.X, filed on Aug. 31, 2021, Chinese Patent Application No. 202111015574.2, filed on Aug. 31, 2021, Chinese Patent Application No. 202111015786.0, filed on Aug. 31, 2021, Chinese Patent Application No. 202111015461.2, filed on Aug. 31, 2021, Chinese Patent Application No. 202122087755.8, filed on Aug. 31, 2021, Chinese Patent Application No. 202122085678.2, filed on Aug. 31, 2021, Chinese Patent Application No. 202122085677.8, filed on Aug. 31, 2021, Chinese Patent Application No. 202122087754.3, filed on Aug. 31, 2021, and Chinese Patent Application No. 202122076596.1, filed on Aug. 31, 2021, which are incorporated herein by reference in their entireties.

TECHNICAL FIELD

The present disclosure relates to the field of optical fiber communication technologies, and in particular, to an optical module.

BACKGROUND

With the development of new services and application scenarios such as cloud computing, mobile internet, and video conference, the development and progress of optical communication technology has become increasingly important. In the optical communication technology, an optical module is a tool for achieving interconversion between an optical signal and an electrical signal and is one of the key devices in an optical communication equipment.

SUMMARY

In an aspect, an optical module is provided. The optical module includes a shell, a circuit board, and a light-emitting device. The shell includes an upper shell and a lower shell. The circuit board is located between the upper shell and the lower shell. The circuit board has a front surface facing towards the upper shell and a back surface facing towards the lower shell. The circuit board includes a mounting hole running through the front surface and the back surface. The light-emitting device is installed on the circuit board, and the light-emitting device includes a base, a laser assembly, a translation prism, and at least one optical fiber coupler. The base is installed on the front surface of the circuit board, and the base has an installation surface and a bottom surface opposite to the installation surface. The installation surface faces towards the front surface, and the bottom surface faces towards the upper shell. The laser assembly is installed on the installation surface and runs through the mounting hole. The translation prism is installed on the installation surface and runs through the mounting hole, so that a first portion of the translation prism is located at a back side of the circuit board, and a second portion of the translation prism is located at a front side of the circuit board. The translation prism is configured to translate a laser beam located at the back side of the circuit board emitted by the laser assembly to the front side of the circuit board. The at least one optical fiber coupler is configured to transmit the laser beam translated by the translation prism to the front side of the circuit board to an outside of the optical module.

In another aspect, an optical module is provided. The optical module includes a shell, a circuit board, a plurality of laser assemblies, a translation prism, a wavelength division multiplexer, and an optical fiber coupler. The shell includes an upper shell and a lower shell. The circuit board is located between the upper shell and the lower shell. The circuit board has a front surface facing towards the upper shell and a back surface facing towards the lower shell. The circuit board includes a mounting hole running through the front surface and the back surface. The plurality of laser assemblies are located in the mounting hole and configured to emit a plurality of laser beams. At least one of the plurality of laser assemblies includes a pad. The pad is flush with the back surface of the circuit board. A first portion of the translation prism is located in the mounting hole, and a second portion of the translation prism protrudes from the front surface of the circuit board. The translation prism is configured to translate the plurality of laser beams to a front side of the circuit board. The wavelength division multiplexer is located at the front side of the circuit board and configured to combine the plurality of laser beams translated by the translation prism into a composite light beam. The optical fiber coupler is configured to transmit the composite light beam to an outside of the optical module. The circuit board further includes a digital signal processing chip, a plurality of via holes, and a plurality of high-frequency signal lines. The digital signal processing chip is fixed on the front surface of the circuit board and is located at a side of the mounting hole. The digital signal processing chip includes a plurality of output pads. The plurality of via holes are located at the plurality of output pads and run through the front surface and the back surface of the circuit board. The plurality of high-frequency signal lines are located on the back surface of the circuit board and are substantially flush with the pad of the laser assembly. Ends of the plurality of high-frequency signal lines are electrically connected to the plurality of output pads through the plurality of via holes and other ends of the plurality of high-frequency signal lines are connected to the pads of the plurality of laser assemblies through wire bonding.

BRIEF DESCRIPTION OF THE DRAWINGS

In order to describe the technical solutions of the embodiments of the present disclosure more clearly, accompanying drawings to be used in some embodiments of the present disclosure will be introduced briefly below. However, the accompanying drawings to be described below are merely some embodiments of the present disclosure, and a person of ordinary skill in the art may obtain other drawings according to these drawings. In addition, the accompanying drawings to be described below may be regarded as schematic diagrams and are not limitations on an actual size of a product, an actual process of a method, and an actual timing of a signal to which the embodiments of the present disclosure relate.

FIG. 16B is a structural diagram of a base in a light-emitting device shown in FIG. 16A;

FIG. 17A is a structural diagram of yet another light-emitting device in an optical module, in accordance with some embodiments;

FIG. 17B is a structural diagram of a base in the light-emitting device shown in FIG. 17A;

DETAILED DESCRIPTION

Figure 1:
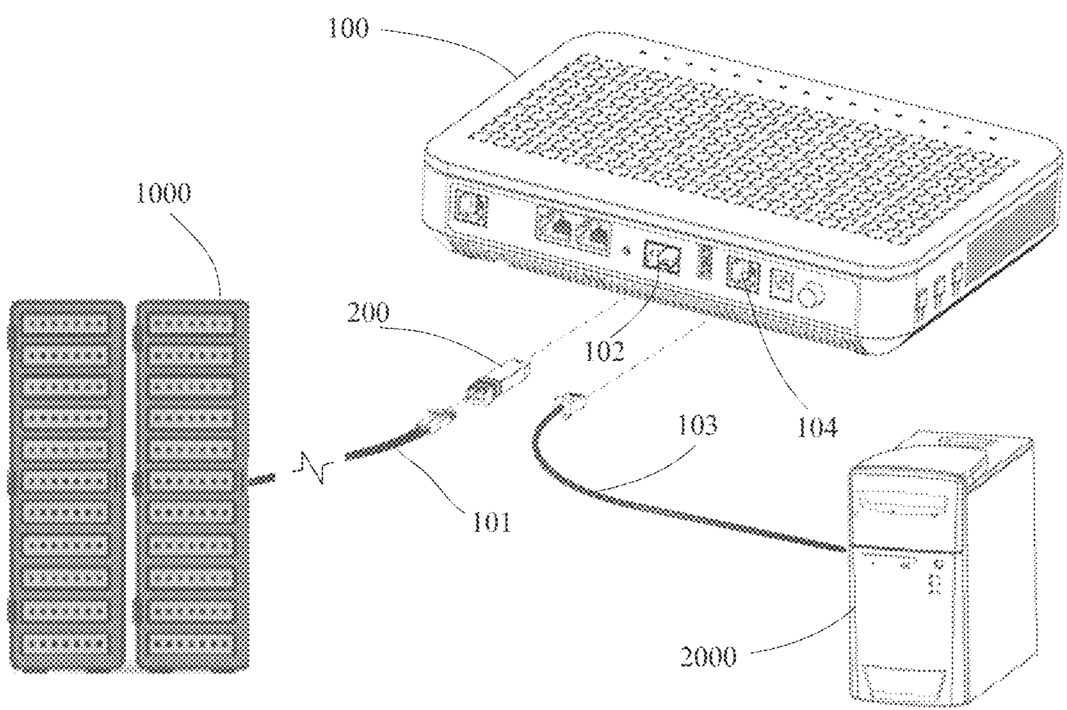
FIG. 1 is a diagram showing a partial structure of an optical communication system, in accordance with some embodiments.

The technical solutions in some embodiments of the present disclosure will be described clearly and completely with reference to the accompanying drawings; however, the described embodiments are merely some but not all of embodiments of the present disclosure. All other embodiments obtained by a person of ordinary skill in the art based on embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

The terms "first" and "second" are used for descriptive purposes only and are not to be construed as indicating or implying a relative importance or implicitly indicating a number of indicated technical features. Thus, features defined by "first" or "second" may explicitly or implicitly include one or more of the features. In the description of the embodiments of the present disclosure, the term "a plurality of" or "the plurality of" means two or more unless otherwise specified.

The phrase "at least one of A, B, and C" has the same meaning as the phrase "at least one of A, B, or C," both including the following combinations of A, B, and C: only A, only B, only C, a combination of A and B, a combination of A and C, a combination of B and C, and a combination of A, B, and C.

The use of the phrase "applicable to" or "configured to" herein means an open and inclusive expression, which does not exclude equipments that are applicable to or configured to perform additional tasks or steps.

The term such as "about," "substantially," or "approximately" as used herein includes a stated value and an average value within an acceptable range of deviation of a particular value. The acceptable range of deviation is determined by a person of ordinary skilled in the art, considering measurement in question and errors associated with measurement of a particular quantity (i.e., limitations of a measurement system).

The optical module can realize inter conversion of optical signals and electrical signals between the information processing equipment and the information transmission equipment. For example, at least one of an optical signal input end or an optical signal output end of the optical module is connected to an optical fiber, and at least one of an electrical signal input end or an electrical signal output end of the optical module is connected to an optical network terminal. A first optical signal from the optical fiber is transmitted to the optical module, and the optical module converts the first optical signal into a first electrical signal and transmits the first electrical signal to the optical network terminal. A second electrical signal from the optical network unit is transmitted to the optical module, and the optical module converts the second electrical signal into a second optical signal and transmits the second optical signal to the optical fiber. Since information can be transmitted between a plurality of information processing equipments through electrical signals, at least one of the plurality of information processing equipments is required to be directly connected to the optical module, without all the information processing equipments being directly connected to the optical module. Here, the information processing equipment directly connected to the optical module is called a master monitor of the optical module. In addition, the optical signal input end or the optical signal output end of the optical module may be called an optical port, and the electrical signal input end or the electrical signal output end of the optical module may be called an electrical port.

FIG. 1 is a diagram showing a partial structure of an optical communication system, in accordance with some embodiments. As shown in FIG. 1, the optical communication system mainly includes a remote information processing equipment 1000, a local information processing equipment 2000, a master monitor 100, an optical module 200, an external optical fiber 101, and a network cable 103.

An end of the external optical fiber 101 extends towards the remote information processing equipment 1000, and another end of the external optical fiber 101 is connected to the optical module 200 through the optical port of the optical module 200. The optical signal can be totally reflected in the external optical fiber 101, and the propagation of the optical signal in the direction of the total reflection may almost maintain an original optical power. The optical signal undergoes the plurality of total reflections in the external optical fiber 101, so that the optical signal from the remote information processing equipment 1000 is transmitted to the optical module 200, or the optical signal from the optical module 200 is transmitted to the remote information processing equipment 1000, so as to realize the information transmission with long-distance and low power consumption.

The optical communication system may include one or more external optical fibers 101, and the external optical fibers 101 are detachably connected to the optical module 200. Alternatively, the external optical fibers 101 are fixedly connected to the optical module 200. The master monitor 100 is configured to provide data signals to the optical module 200, receive data signals from the optical module 200, or monitor or control the working status of the optical module 200.

The master monitor 100 includes a housing in a substantially cuboid shape and an optical module interface 102 disposed in the housing. The optical module interface 102 is configured to access the optical module 200, so that one-way electrical signal connection or bidirectional electrical signal connection between the master monitor 100 and the optical module 200 is established.

The master monitor 100 also includes an external electrical interface, and the external electrical interface may be connected to an electrical signal network. For example, the external electrical interface includes a universal serial bus (USB) interface or a network cable interface 104, and the network cable interface 104 is configured to connect to the network cable 103, so that the one-way electrical signal connection and the bidirectional electrical signal connection between the master monitor 100 and the network cable 103 are established. An end of the network cable 103 is connected to a local information processing equipment 2000, and another end of the network cable 103 is connected to the master monitor 100, so as to establish an electrical signal connection between the local information processing equipment 2000 and the master monitor 100 through the network cable 103. For example, a third electrical signal sent by the local information processing equipment 2000 is transmitted to the master monitor 100 through the network cable 103, and the master monitor 100 generates a second electrical signal according to the third electrical signal; the second electrical signal from the master monitor 100 is transmitted to the optical module 200, the optical module 200 converts the second electrical signal into a second optical signal, and transmits the second optical signal to the external optical fiber 101: and the second optical signal is transmitted to the remote information processing equipment 1000 in the external optical fiber 101. For example, the first optical signal from the remote information processing equipment 1000 propagates through the external optical fiber 101; the first optical signal from the external optical fiber 101 is transmitted to the optical module 200; the optical module 200 converts the first optical signal into a first electrical signal and transmits the first electrical signal to the master monitor 100; and the master monitor 100 generates a fourth electrical signal according to the first electrical signal and transmits the fourth electrical signal to the local information processing equipment 2000. It will be noted that the optical module is a tool to realize the interconversion of the optical signal and the electrical signal. During the conversion process of the above optical signal and electrical signal, the information does not change, and the encoding and decoding methods of information may change.

In addition to the optical network unit, the master monitor 100 further includes an optical line terminal (OLT), an optical network terminal (ONT), or a data center server.

Figure 2:
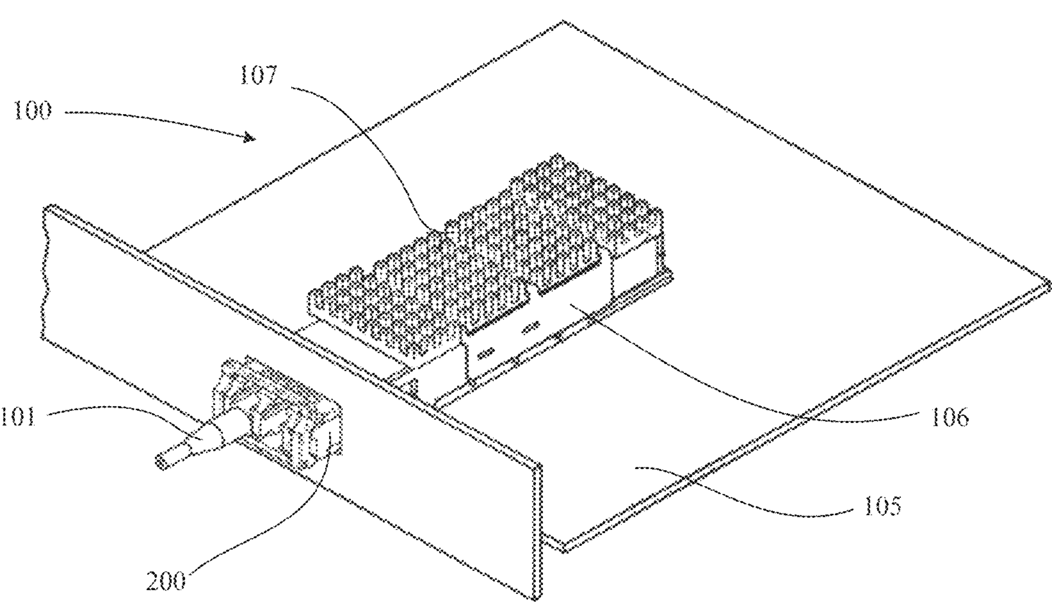
FIG. 2 is a diagram showing a structure of an optical network terminal, in accordance with some embodiments.

FIG. 2 is a diagram showing a structure of an optical network terminal, in accordance with some embodiments. In order to clearly show a connection relationship between the optical module 200 and the master monitor 100, FIG. 2 only shows structures of the master monitor 100 that are related to the optical module 200. As shown in FIG. 2, the master monitor 100 further includes a PCB circuit board 105 disposed in the housing, a cage 106 disposed on a surface of the PCB circuit board 105, a heat sink 107 disposed on the cage 106, and an electrical connector disposed inside the cage 106. The electrical connector is configured to access the electrical port of the optical module 200, and the heat sink 107 has protruding structures such as fins for increasing a heat dissipation area.

The optical module 200 is inserted into the cage 106 of the master monitor 100, and the optical module 200 is fixed by the cage 106. Heat generated by the optical module 200 is conducted to the cage 106 and then is dissipated through the heat sink 107. After the optical module 200 is inserted into the cage 106, the electrical port of the optical module 200 is connected to the electrical connector inside the cage 106, so that the bidirectional electrical signal connection is established between the optical module 200 and the master monitor 100. In addition, the optical port of the optical module 200 is connected to the external optical fiber 101, so that a bidirectional optical signal connection is established between the optical module 200 and the external optical fiber 101.

Figures 3, 4:
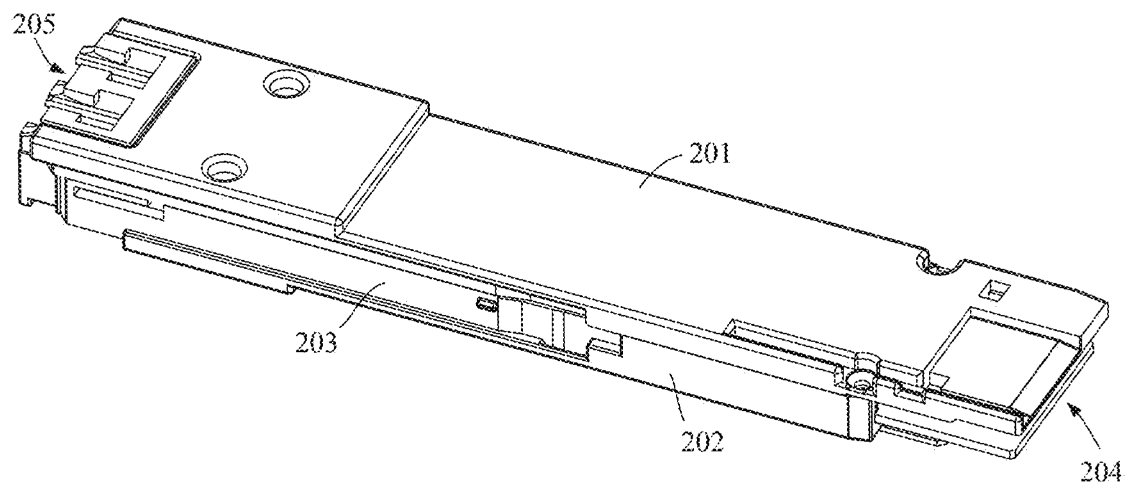
FIG. 3 is a structural diagram of an optical module, in accordance with some embodiments.
FIG. 4 is an exploded view of an optical module, in accordance with some embodiments.

FIG. 3 is a structural diagram of an optical module, in accordance with some embodiments, and FIG. 4 is an exploded view of an optical module, in accordance with some embodiments.

As shown in FIGS. 3 and 4, the optical module 200 includes a shell, and a circuit board 300, a light-emitting device 400, and a light-receiving device 500 that are disposed inside the shell. However, the present disclosure is not limited thereto. In some embodiments, the optical module 200 includes one of the light-emitting device 400 and the light-receiving device 500.

The shell includes an upper shell 201 and a lower shell 202. The upper shell 201 is covered on the lower shell 202 to form the shell having two openings 204 and 205, and an outer contour of the shell is generally in a cuboid shape.

In some embodiments, the lower shell 202 includes a bottom plate 2021 and two lower side plates 2022 that are located on two sides of the bottom plate 2021 and disposed perpendicular to the bottom plate 2021; the upper shell 201 includes a cover plate 2011, and the cover plate 2011 covers the two lower side plates 2022 of the lower shell 202 to form the shell.

In some embodiments, the lower shell 202 includes a bottom plate 2021 and two lower side plates 2022 located on both sides of the bottom plate 2021, respectively, and disposed perpendicular to the bottom plate 2021; the upper shell 201 may include a cover plate 2011 and two upper side plates located on both sides of the cover plate 2011 respectively and disposed perpendicular to the cover plate 2011; and the two upper side plates are combined with the two lower side plates 2022 respectively, so that the upper shell 201 covers the lower shell 202.

A direction in which a connecting line between two openings 204 and 205 is located may be the same as a longitudinal direction of the optical module 200 or may not be the same as the longitudinal direction of the optical module 200. For example, the opening 204 is located at an end (a right end in FIG. 3) of the optical module 200, and the opening 205 is also located at an end (a left end in FIG. 3) of the optical module 200. Alternatively, the opening 204 is located at an end of the optical module 200, and the opening 205 is located at a side of the optical module 200. The opening 204 is the electrical port, and a connecting finger 301 of the circuit board 300 extends from the electrical port 204 and is inserted into an electrical connector of the master monitor 100. The opening 205 is the optical port, which is configured to access the external optical fiber 101, so that the external optical fiber 101 is connected to the light-emitting device 400 and the light-receiving device 500 in the optical module 200.

By adopting an assembly mode of combining the upper shell 201 and the lower shell 202, it may be easy to install the circuit board 300, the light-emitting device 400, and the light-receiving device 500 into the shell, and the upper shell 201 and the lower shell 202 may provide sealing and protection for these devices. In addition, when assembling the circuit board 300, the light-emitting device 400, and the light-receiving device 500, it may be easy to arrange the positioning components, heat dissipation components, and electromagnetic shielding components of these devices, which facilitates automated production.

In some embodiments, the upper shell 201 covers the lower shell 202 to define an installation cavity between the upper shell 201 and the lower shell 202. The circuit board 300 and the light-emitting device 400 are disposed in the installation cavity.

In some embodiments, the upper shell 201 and the lower shell 202 are made of a metal material, which is conducive to electromagnetic shielding and heat dissipation.

In some embodiments, the optical module 200 further includes an unlocking component 203 located outside the shell. The unlocking component 203 is configured to implement a fixed connection between the optical module 200 and the master monitor or to release the fixed connection between the optical module 200 and the master monitor.

For example, the unlocking component 203 is located outside the two lower side plates 2022 of the lower shell 202 and includes an engagement portion that is matched with the cage 106 of the master monitor 100. When the optical module 200 is inserted into the cage 106, the optical module 200 is fixed in the cage 106 by the engagement portion of the unlocking component 203. When the unlocking component 203 is pulled, the engagement portion of the unlocking component 203 moves along with the unlocking component 203, and then a connection relationship between the engagement portion and the master monitor is changed, so as to release the fixation between the optical module 200 and the master monitor, so that the optical module 200 may be pulled out of the cage 106.

The circuit board 300 includes circuit wirings, electronic elements, and chips, and the electronic elements and the chips are connected according to a circuit design through the circuit wiring, so as to implement functions such as power supply, transmission of an electrical signal, and grounding. The electronic elements may include, for example, a capacitor, a resistor, a triode, and a metal-oxide-semiconductor field-effect transistor (MOSFET). The chips may include, for example, a microcontroller unit (MCU), a laser driving chip, a transimpedance amplifier (TIA), a limiting amplifier, a clock and data recovery (CDR) chip, a power management chip, or a digital signal processing (DSP) chip.

The circuit board 300 is generally a rigid circuit board. Due to the relatively hard material of the rigid circuit board, the rigid circuit board can also achieve bearing effects. For example, the rigid circuit board may stably bear the electronic elements and the chips, and the rigid circuit board may also be inserted into the electrical connector in the cage 106 of the master monitor 100.

The circuit board 300 further includes the connecting finger 301 formed on an end surface thereof, and the connecting finger 301 is composed of a plurality of independent pins. The circuit board 300 is inserted into the cage 106, and the circuit board 300 is conducted with the electrical connector in the cage 106 through the connecting finger 301. The connecting finger 301 may be disposed on only one surface of the circuit board 300. Alternatively, the connecting finger 301 may also be disposed on both upper and lower surfaces of the circuit board 300 to provide a larger number of pins, so as to adapt to an occasion where a large number of pins are needed. The connecting finger 301 is configured to establish electrical connection with the master monitor, so as to implement power supply, grounding, inter-integrated circuit (I2C) signal transmission, and data signal transmission. Of course, flexible circuit boards are also used in some optical modules. A flexible circuit board is generally used in conjunction with the rigid circuit board as a supplement to the rigid circuit board.

At least one of the light-emitting device 400 or the light-receiving device 500 is located on a side of the circuit board 300 away from the connecting finger 301.

In some other embodiments, the light-emitting device 400 and the light-receiving device 500 are physically separated from the circuit board 300, respectively, and are each electrically connected to the circuit board 300 through the corresponding flexible circuit board or electrical connecting member, respectively.

In some embodiments, at least one of the light-emitting device 400 or the light-receiving device 500 may be directly disposed on the circuit board 300. For example, at least one of the light-emitting device 400 or the light-receiving device 500 may be disposed on a surface of the circuit board 300 or the side of the circuit board 300.

Figure 5:
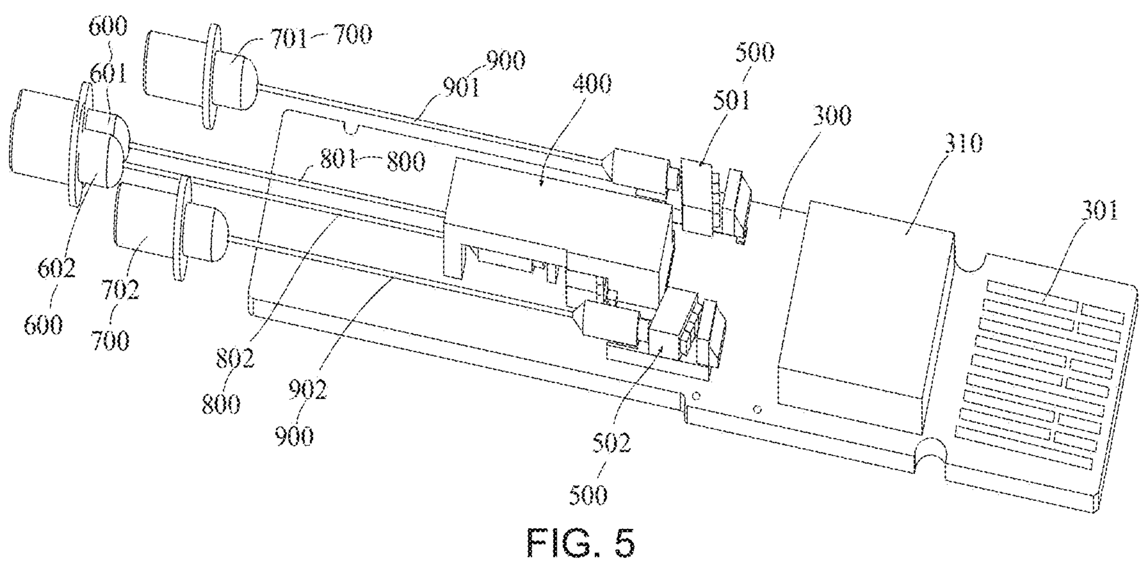
FIG. 5 is a structural diagram of an optical module without a shell and an unlocking component, in accordance with some embodiments.
Figure 6:
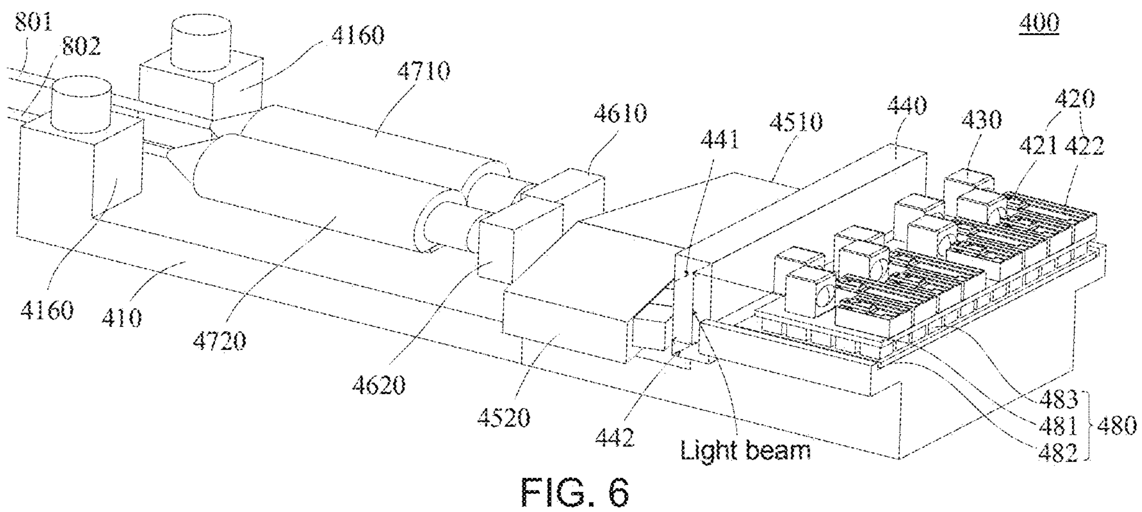
FIG. 6 is a structural diagram of a light-emitting device in an optical module, in accordance with some embodiments.

FIG. 5 is a structural diagram of an optical module without a shell and an unlocking component, in accordance with some embodiments, and FIG. 6 is a structural diagram of a light-emitting device in an optical module, in accordance with some embodiments. As shown in FIGS. 5 and 6, the optical module 200 further includes a first optical fiber adapter 600, a second optical fiber adapter 700, a first internal optical fiber 800, and a second internal optical fiber 900. The first optical fiber adapter 600 is connected to the light-emitting device 400 through the first internal optical fiber 800, and the second optical fiber adapter 700 is connected to the light-receiving device 500 through the second internal optical fiber 900.

In some embodiments, the first optical fiber adapter 600 includes a first optical fiber sub-adapter 601 and a second optical fiber sub-adapter 602. The first internal optical fiber 800 includes a first internal sub-optical fiber 801 and a second internal sub-optical fiber 802. The first optical fiber sub-adapter 601 is connected to the light-emitting device 400 through the first internal sub-optical fiber 801, and the second optical fiber sub-adapter 602 is connected to the light-emitting device 400 through the second internal sub-optical fiber 802.

The light-receiving device 500 includes a first light-receiving sub-device 501 and a second light-receiving sub-device 502. The second internal optical fiber 900 includes a third internal sub-optical fiber 901 and a fourth internal sub-optical fiber 902. The second optical fiber adapter 700 includes a third optical fiber sub-adapter 701 and a fourth optical fiber sub-adapter 702. The third optical fiber sub-adapter 701 is connected to the first light-receiving sub-device 501 through the third internal sub-optical fiber 901, and the fourth optical fiber sub-adapter 702 is connected to the second light-receiving sub-device 502 through the fourth internal sub-optical fiber 902.

Both the light-emitting device 400 and the light-receiving device 500 are disposed on a surface of the circuit board 300 proximate to the upper shell 201 (hereinafter, the surface is referred to as a front surface, and a surface of the circuit board 300 proximate to the lower shell 202 is referred to as a back surface), and the first light-receiving sub-device 501 and the second light-receiving sub-device 502 are located on both sides of the light-emitting device 400, respectively. For example, the first light-receiving sub-device 501 and the second light-receiving sub-device 502 are located on both sides of the light-emitting device 400 along a width direction of the light-emitting device 400, respectively.

The light-emitting device 400 includes a base 410 and a laser 420 (i.e., a laser assembly), a first collimating lens 430, a translation prism 440, wavelength division multiplexers, optical isolators, optical fiber couplers, and a thermo electric cooler (TEC) 480 that are disposed on the base 410.

The base 410 has an installation surface and a bottom surface. The laser 420, the first collimating lens 430, the translation prism 440, the wavelength division multiplexers, the optical isolators, the optical fiber couplers, and the thermo electric cooler 480 are each installed on the installation surface of the base 410. The bottom surface of the base 410 is a surface opposite to the installation surface of the base 410.

The laser 420 includes a laser chip 421 and a spacer 422. The laser chip 421 has a cathode and an anode, the spacer 422 includes an insulating heat conductive layer and a metal layer, and the metal layer includes a ground wire and a signal line. The cathode of the laser chip 421 may be fixed to the ground wire by means of welding or bonding through conductive adhesive, thereby electrically connecting to the ground line. The anode of the laser chip 421 may be electrically connected to the signal line through a connecting wire. The laser chip 421 may emit a laser beam parallel to the front surface of the circuit board 300 by applying voltage to the cathode and the anode of the laser chip 421 through the ground wire and the signal line, respectively.

The thermo electric cooler 480 is disposed on the installation surface of the base 410, and the laser 420 is disposed on a surface of the thermo electric cooler 480 away from the base 410. The thermo electric cooler 480 is configured to conduct the heat generated by the laser chip 421 to the base 410. In this way, the heat may be conducted to the outside of the optical module 200 through the base 410 and the shell of the optical module 200.

In some embodiments, the thermo electric cooler 480 includes a first heat exchange surface 481 and a second heat exchange surface 482 that are disposed opposite to each other and a plurality of heat conduction columns 483 located between the first heat exchange surface 481 and the second heat exchange surface 482. The first heat exchange surface 481 and the second heat exchange surface 482 are connected through the plurality of heat conduction columns 483.

In some embodiments, the plurality of heat conduction columns 483 may be arranged in an array and may be made of a semiconductor material. For example, the first heat exchange surface 481 of the thermo electric cooler 480 is disposed on the installation surface of the base 410, and the laser 420 is disposed on the second heat exchange surface 482 of the thermo electric cooler 480. However, in some embodiments, the thermo electric cooler 480 may be omitted, and in this case, the optical module 200 does not include the thermo electric cooler 480.

The first collimating lens 430 is configured to adjust a divergent laser beam generated by the laser chip 421 into a parallel laser beam, that is, a collimated laser beam. In some embodiments, the first collimating lens 430 may also be omitted, and in this case, the optical module 200 does not include the first collimating lens 430.

The translation prism 440 is a rhombic prism having a first reflective surface 441 and a second reflective surface 442. Both the first reflective surface 441 and the second reflective surface 442 are configured to change a propagation direction of the laser beam, for example, to change the propagation direction of the laser beam by 90°.

In some embodiments, the first reflective surface 441 reflects a laser beam parallel to the front surface of the circuit board 300 emitted by the laser chip 421, so that the laser beam continues to propagate in a direction perpendicular to the front surface of the circuit board 300. The second reflective surface 442 reflects the laser beam perpendicular to the front surface of the circuit board 300, so that the laser beam propagates in the direction parallel to the front surface of the circuit board 300.

A laser beam emitted by the laser 420 is converted into a collimated light beam through the first collimating lens 430. The collimated light beam is reflected twice by the translation prism 440 and then is incident on the optical fiber couplers through the wavelength division multiplexers and the optical isolators. Then, the collimated light beam is coupled to the first optical fiber adapter 600 through the optical fiber couplers, so as to implement the transmission of an optical signal.

In some embodiments, the optical module 200 is an optical module with a high transmission rate. For example, in a case where the optical module 200 is an 800G optical module (that is, the signal transmission rate of the optical module 200 is 800G bit/s), it is necessary to encapsulate eight optical signal transmission channels in the shell of the optical module 200, where a signal transmission rate of each optical signal transmission channel is 100G bit/s. Therefore, the light-emitting device 400 includes eight lasers 420 to realize the transmission of eight optical signals, and the light-receiving device 500 includes eight optical receivers to realize the reception of eight optical signals. For example, the first light-receiving sub-device 501 includes four optical receivers to realize the reception of four optical signals in the eight optical signals. The second light-receiving sub-device 502 includes four optical receivers to realize the reception of other four optical signals in the eight optical signals.

Based on this, the light-emitting device 400 includes eight lasers 420, eight first collimating lenses 430, and a translation prism 440. The lasers 420 correspond to the first collimating lenses 430, respectively. Each laser 420 emits a single laser beam, and a corresponding first collimating lens 430 converts the single laser beam into a single collimated light beam, and the single collimated light beam exited from the corresponding first collimating lens 430 is transmitted to the translation prism 440. The translation prism 440 reflects the single collimated light beam to change the transmission direction and the position of the single collimated light beam.

It will be noted that, in some embodiments, the light-emitting device 400 may also include a plurality of translation prisms 440, and each translation prism 440 may correspond to one or more first collimating lenses 430. The light-emitting device 400 may also include four first collimating lenses 430 (every two lasers 420 share one first collimating lens 430), two first collimating lenses 430 (every four lasers 420 share one first collimating lens 430), or one first collimating lens 430 (eight lasers 420 share one first collimating lens 430).

In addition, the wavelength division multiplexers include a first wavelength division multiplexer 4510 and a second wavelength division multiplexer 4520, the optical isolators include a first optical isolator 4610 and a second optical isolator 4620, and the optical fiber couplers include a first optical fiber coupler 4710 and a second optical fiber coupler 4720. However, the present disclosure is not limited thereto. In some embodiments, the first wavelength division multiplexer 4510 and the second wavelength division multiplexer 4520 may be integrated into a single integrated wavelength division multiplexer, and the first optical isolator 4610 and the second optical isolator 4620 may be integrated into a single integrated optical isolator. In a case where the first wavelength division multiplexer 4510 and the second wavelength division multiplexer 4520 are integrated into the single integrated wavelength division multiplexer, the first optical fiber coupler 4710 and the second optical fiber coupler 4720 may be integrated into a single integrated optical fiber coupler, and the first optical fiber sub-adapter 601 and the second optical fiber sub-adapter 602 may be integrated into a single integrated optical fiber adapter.

The first wavelength division multiplexer 4510 and the second wavelength division multiplexer 4520 are arranged side by side on the installation surface of the base 410. For example, the first wavelength division multiplexer 4510 and the second wavelength division multiplexer 4520 are arranged side by side on the installation surface of the base 410 in a direction (i.e., a predetermined direction) perpendicular to a light-emitting direction of the laser 420 and parallel to the front surface of the circuit board 300. Optical input ends of the first wavelength division multiplexer 4510 and the second wavelength division multiplexer 4520 face towards an optical output end of the translation prism 440, so that the eight laser beams parallel to the front surface of the circuit board 300 are incident on the first wavelength division multiplexer 4510 and the second wavelength division multiplexer 4520.

The first wavelength division multiplexer 4510 is configured to combine a part of the plurality of laser beams reflected by the translation prism 440 into a first composite light beam. The second wavelength division multiplexer 4520 is arranged side by side with the first wavelength division multiplexer 4510 in the predetermined direction and is configured to combine another part of the plurality of laser beams reflected by the translation prism 440 into a second composite light beam.

It will be noted that the plurality of laser beams include the part of the laser beams and the another part of the laser beams.

For example, four laser beams are incident on the first wavelength division multiplexer 4510, and the first wavelength division multiplexer 4510 combines the four laser beams into the first composite light beam. The another four laser beams are incident on the second wavelength division multiplexer 4520, and the second wavelength division multiplexer 4520 combines the another four laser beams into the second composite light beam.

The first wavelength division multiplexer 4510 includes four light inlets for receiving light beams with different wavelengths, and each light inlet is used for receiving a light beam with a corresponding wavelength. The light inlet is located at a light input end of the first wavelength division multiplexer 4510 on a side proximate to the translation prism 440. The first wavelength division multiplexer 4510 further includes a light outlet for transmitting light. The light outlet is located at a light output end of the first wavelength division multiplexer 4510 on a side away from the translation prism 440.

Considering an example in which the first wavelength division multiplexer 4510 receives light beams with four wavelengths λ1, λ2, λ3, and λ4, a light beam with a wavelength of λ1 is incident on the first wavelength division multiplexer 4510 through a first light inlet and reaches the light outlet after passing through multiple different positions (e.g., six positions) in the first wavelength division multiplexer 4510 to be reflected multiple times (e.g., six times). A light beam with a wavelength of λ2 is incident on the first wavelength division multiplexer 4510 through a second light inlet and reaches the light outlet after passing through multiple different positions (e.g., four positions) in the first wavelength division multiplexer 4510 to be reflected multiple times (e.g., four times). A light beam with a wavelength of λ3 is incident on the first wavelength division multiplexer 4510 through a third light inlet and reaches the light outlet after passing through multiple different positions (e.g., two positions) in the first wavelength division multiplexer 4510 to be reflected multiple times (e.g., two times). A light beam with a wavelength of λ4 is incident on the first wavelength division multiplexer 4510 through a fourth inlet and directly reaches the outlet without reflection. In this way, the first wavelength division multiplexer 4510 realizes that the light beams with different wavelengths are input through different light inlets and output through a same light outlet, and then the light beams with different wavelengths are combined into the first composite light beam.

The first light inlet is, for example, one of the four light inlets of the first wavelength division multiplexer 4510 farthest from the second wavelength division multiplexer 4520, and the fourth light inlet is, for example, one of the four light inlets of the first wavelength division multiplexer 4510 closest to the second wavelength division multiplexer 4520.

The second wavelength division multiplexer 4520 includes four light inlets for receiving light beams with different wavelengths, and each light inlet is used for receiving a light beam with a corresponding wavelength. The light inlet is located at a light input end of the second wavelength division multiplexer 4520 on a side proximate to the translation prism 440. The second wavelength division multiplexer 4520 further includes a light outlet for transmitting light. The light outlet is located at a light output end of the second wavelength division multiplexer 4520 on a side away from the translation prism 440.

Considering an example in which the second wavelength division multiplexer 4520 receives light beams with four wavelengths λ5, λ6, λ7, and λ8, and a light beam with a wavelength of λ5 is incident on the second wavelength division multiplexer 4520 through a fifth light inlet and reaches the light outlet after passing through multiple different positions (e.g., six positions) in the second wavelength division multiplexer 4520 to be reflected multiple times (e.g., six times). A light beam with a wavelength of λ6 is incident on the second wavelength division multiplexer 4520 through a sixth light inlet and reaches the light outlet after passing through multiple different positions (e.g., four positions) in the second wavelength division multiplexer 4520 to be reflected multiple times (e.g., four times). Alight beam with a wavelength of λ7 is incident on the second wavelength division multiplexer 4520 through a seventh light inlet and reaches the light outlet after passing through multiple different positions (e.g., two positions) in the second wavelength division multiplexer 4520 to be reflected multiple times (e.g., two times). A light beam with a wavelength of λ8 is incident on the wavelength division multiplexer 4510 through an eighth inlet and directly reaches the outlet without reflection. In this way, the second wavelength division multiplexer 4520 realizes that light beams of different wavelengths are input through different light inlets and output through the same light outlet, and then the light beams of different wavelengths are combined into the second composite light beam.

Figure 7:
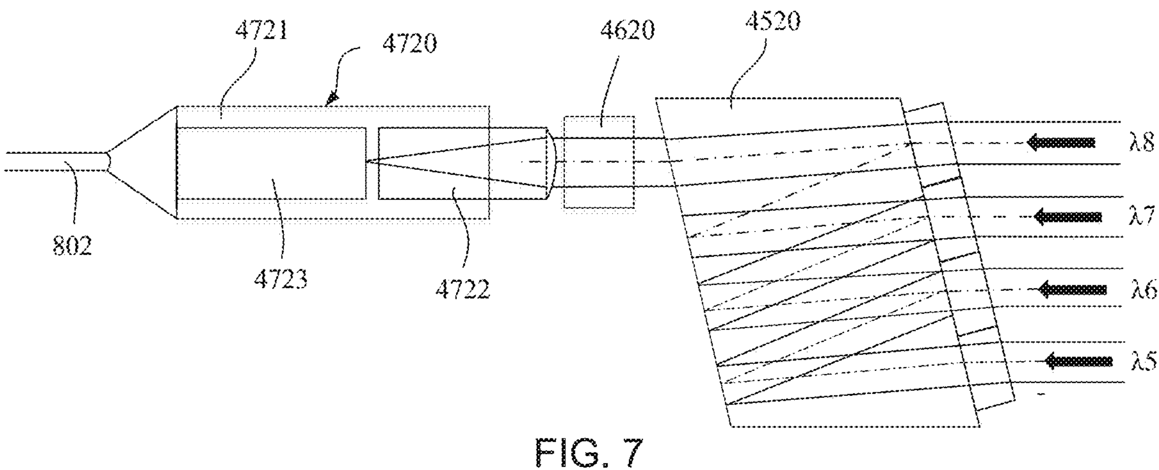
FIG. 7 is a diagram showing a partial optical path of a light-emitting device in an optical module, in accordance with some embodiments.

FIG. 7 is a diagram showing a partial optical path of a light-emitting device in an optical module, in accordance with some embodiments. FIG. 7 shows the reflection positions and the reflection times of the light beams with the four wavelengths of λ5, λ6, λ7, and λ8 in the second wavelength division multiplexer 4520. Similarly, the reflection positions and reflection times of the light beams with the four wavelengths of λ1, λ2, λ3, and λ4 in the first wavelength division multiplexer 4510 may be obtained according to FIG. 7.

The fifth light inlet is, for example, one of the four light inlets of the second wavelength division multiplexer 4520 farthest from the first wavelength division multiplexer 4510, and the eighth light inlet is, for example, one of the four light inlets of the second wavelength division multiplexer 4520 closest to the first wavelength division multiplexer 4510.

The wavelength λ5 may be the same or different from the wavelength λ1, the wavelength λ6 may be the same or different from the wavelength λ2, the wavelength λ7 may be the same or different from the wavelength λ3, and the wavelength λ8 may be the same or different from the wavelength λ4.

The optical input end of the first optical fiber coupler 4710 is optically coupled with the optical output end of the first wavelength division multiplexer 4510, and the optical output end of the first optical fiber coupler 4710 is connected to the first optical fiber sub-adapter 601 through the first internal sub-optical fiber 801. In this way, the first composite light beam output by the first wavelength division multiplexer 4510 is coupled to the first internal sub-optical fiber 801 through the first optical fiber coupler 4710, and then transmitted to the first optical fiber sub-adapter 601 through the first internal sub-optical fiber 801, so as to implement the emission of the first composite light beam.

The optical input end of the second optical fiber coupler 4720 is optically coupled with the optical output end of the second wavelength division multiplexer 4520, and the optical output end of the second optical fiber coupler 4720 is connected to the second optical fiber sub-adapter 602 through the second internal sub-optical fiber 802. In this way, the second composite light beam output by the second wavelength division multiplexer 4520 is coupled to the second internal sub-optical fiber 802 through the second optical fiber coupler 4720 and then transmitted to the second optical fiber sub-adapter 602 through the second internal sub-optical fiber 802, so as to implement the emission of the first composite light beam.

There is a gap between the optical output end of the first wavelength division multiplexer 4510 and the optical input end of the first optical fiber coupler 4710. When the first composite light beam output by the first wavelength division multiplexer 4510 is transmitted to the optical input end of the first optical fiber coupler 4710, the first composite light beam is reflected at the optical input end of the first optical fiber coupler 4710, and the reflected light beam may return to the laser 420 along an original path, thereby affecting the performance of the laser 420. In order to solve this problem, the first optical isolator 4610 is disposed between the first wavelength division multiplexer 4510 and the first optical fiber coupler 4710. In this way, when the first composite light beam exited from the first wavelength division multiplexer 4510 is reflected at the optical input end of the first optical fiber coupler 4710, the first optical isolator 4610 is used to isolate the reflected light beam and prevent the reflected light beam from returning to the laser 420 along the original path.

Similarly, there is a gap between the optical output end of the second wavelength division multiplexer 4520 and the optical input end of the second optical fiber coupler 4720. When the second composite light beam output by the second wavelength division multiplexer 4520 is transmitted to the optical input end of the second optical fiber coupler 4720, the second composite light beam is reflected at the optical input end of the second optical fiber coupler 4720, and the reflected light beam may return to the laser 420 along an original path, thereby affecting the performance of the laser 420. In order to solve this problem, the second optical isolator 4620 is disposed between the second wavelength division multiplexer 4520 and the second optical fiber coupler 4720. In this way, when the second composite light beam exited from the second wavelength division multiplexer 4520 is reflected at the optical input end of the second optical fiber coupler 4720, the second optical isolator 4620 is used to isolate the reflected light beam and prevent the reflected light beam from returning to the laser 420 along the original path.

As shown in FIG. 7, in some embodiments, the second optical fiber coupler 4720 includes a second sleeve 4721, a second focusing lens 4722, and a second single-mode optical fiber flange 4723. The second sleeve 4721 is sleeved on the outside of the second focusing lens 4722 and the second single-mode optical fiber flange 4723, and the second focusing lens 4722 is closer to the second wavelength division multiplexer 4520 than the second single-mode optical fiber flange 4723. The second internal sub-optical fiber 802 is inserted into the second single-mode optical fiber flange 4723, a light incident surface of the second focusing lens 4722 faces towards the second optical isolator 4620, and a light exit surface of the second focusing lens 4722 faces towards the second single-mode optical fiber flange 4723. The second composite light beam output by the second wavelength division multiplexer 4520 is transmitted to the second focusing lens 4722 through the second optical isolator 4620, and the second focusing lens 4722 converges the second composite light beam into the second internal sub-optical fiber 802.

The second focusing lens 4722 is a cylindrical lens, and an outer diameter of the cylindrical lens and an outer diameter of the second single-mode optical fiber flange 4723 are slightly smaller than an inner diameter of the second sleeve 4721, so as to ensure the coupling degree between the second focusing lens 4722 and the second single-mode optical fiber flange 4723. In a case where the second focusing lens 4722 and the second single-mode optical fiber flange 4723 are inserted into the second sleeve 4721, in order to improve the coupling degree between the second focusing lens 4722 and the second single-mode optical fiber flange 4723, the second focusing lens 4722 and the second single-mode optical fiber flange 4723 may be moved axially, and the operation is convenient.

In order to facilitate the second composite light beam passing through the second optical isolator 4620 to be incident on the second focusing lens 4722, the second focusing lens 4722 protrudes outside the second sleeve 4721, so that a distance between the light incident surface of the second focusing lens 4722 and the light exit surface of the second optical isolator 4620 may be reduced, which makes an internal structure of the light-emitting device 400 more compact.

Figure 10A:
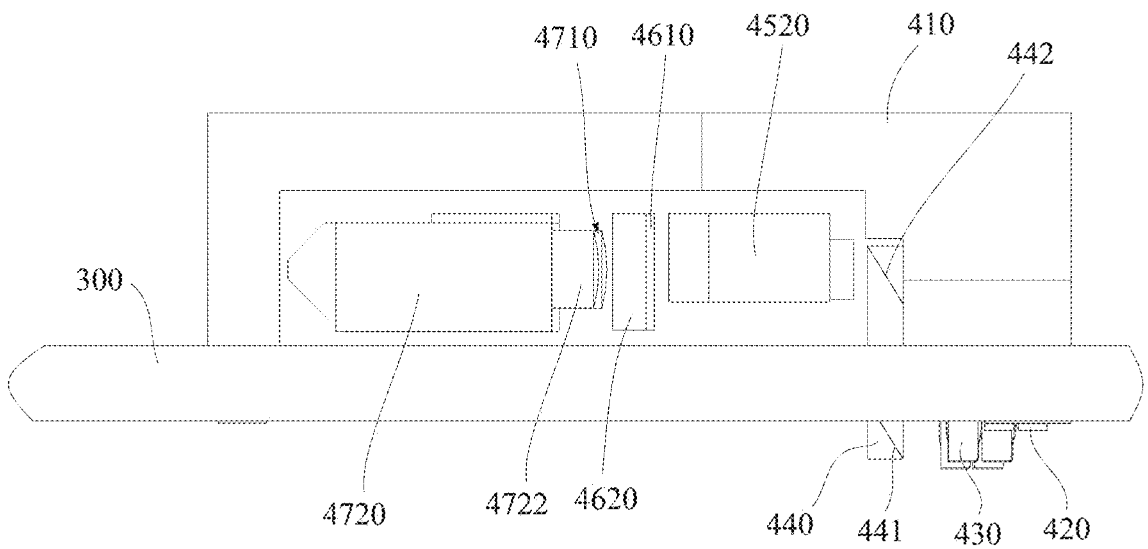
FIG. 10A is a side view of a circuit board and a light-emitting device in an optical module, in accordance with some embodiments.
Figure 10B:
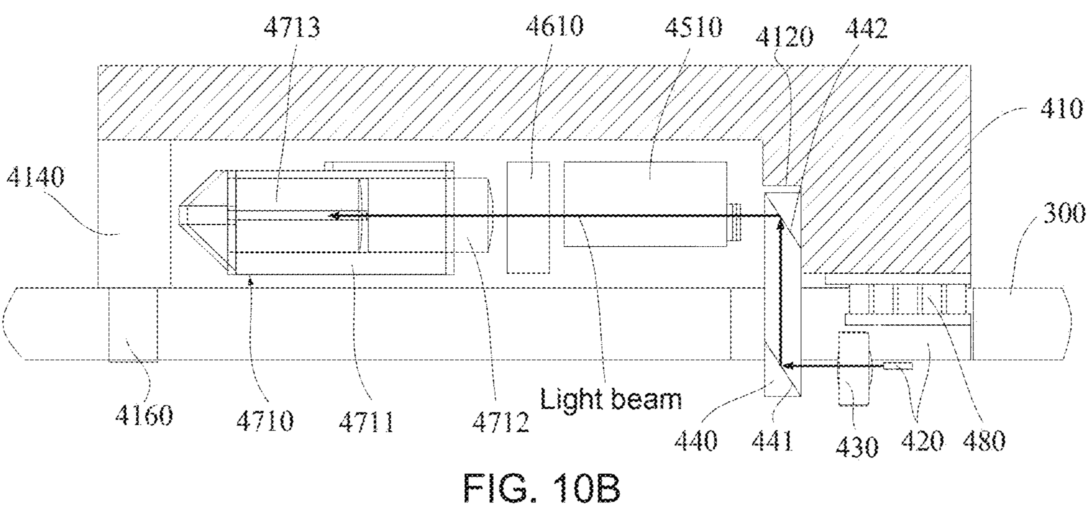
FIG. 10B is a cross-sectional view of the optical module in FIG. 10A.

As shown in FIGS. 10A and 10B, the first optical fiber coupler 4710 includes a first sleeve 4711, a first focusing lens 4712, and a first single-mode optical fiber flange 4713. The structure and function of the first optical fiber coupler 4710 are similar to that of the second optical fiber coupler 4720, and details will not be repeated herein.

As the volume of the optical module decreases and the signal transmission rate increases, the internal structure of the optical module is required to be as simple as possible, which is facilitated for arranging the optical elements and electronic components rationally. In the optical module 200 provided by some embodiments of the present disclosure, the wavelength division multiplexer is used to combine the plurality of light beams in the plurality of optical signal transmission channels (e.g., four channels, or eight channels) into a composite light beam, which simplifies the internal structure of the optical module 200 and is beneficial for the optical module to implement high-speed signal transmission.

Figure 8:
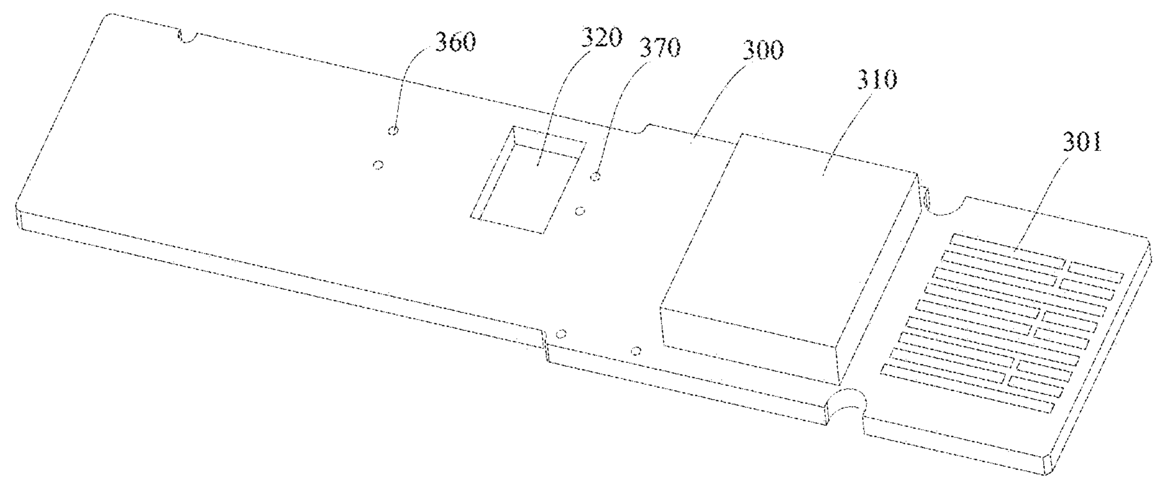
FIG. 8 is a structural diagram of a circuit board in an optical module, in accordance with some embodiments.
Figure 9A:
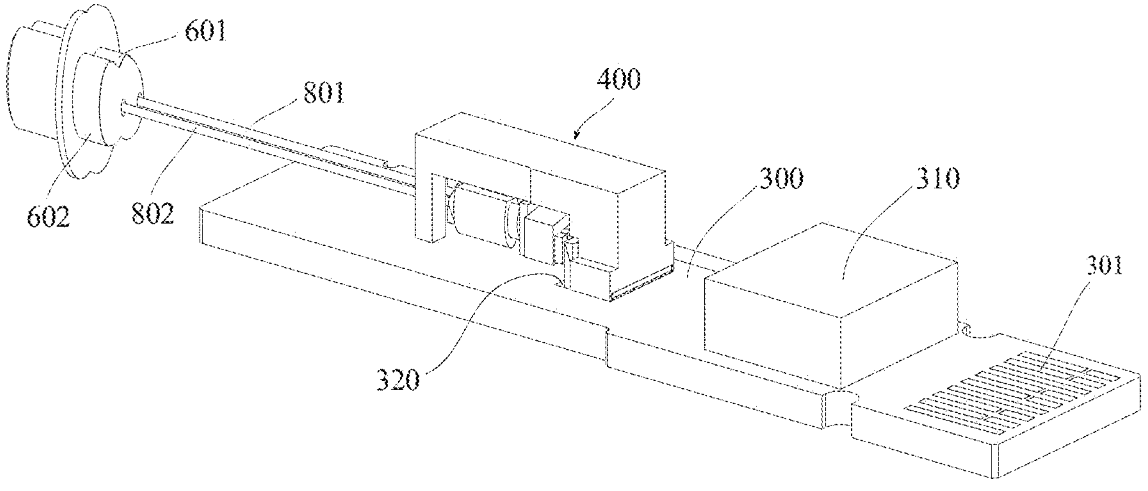
FIG. 9A is an assembly diagram of a circuit board and a light-emitting device in an optical module, in accordance with some embodiments.
Figure 9B:
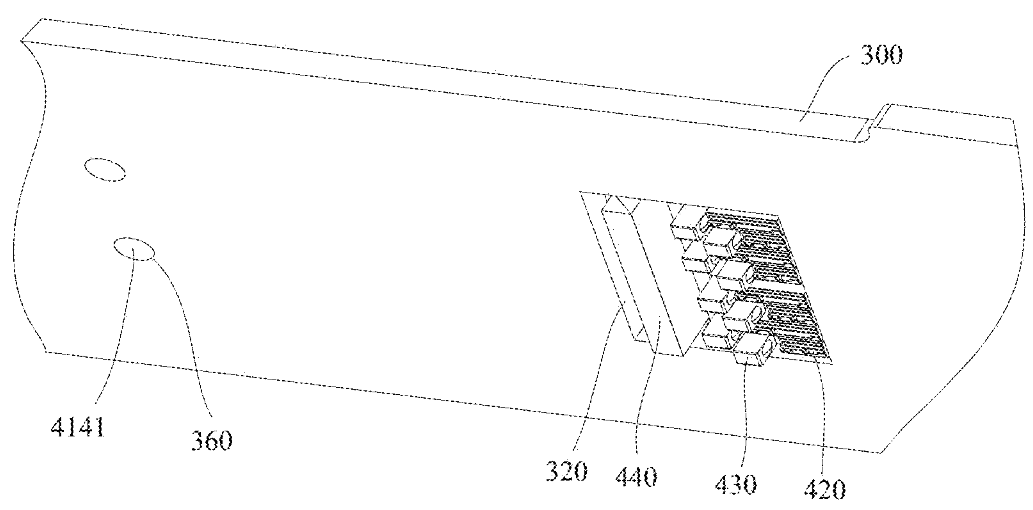
FIG. 9B is an assembly diagram of a circuit board and a light-emitting device in an optical module from another perspective, in accordance with some embodiments.

FIG. 8 is a structural diagram of a circuit board in an optical module, in accordance with some embodiments; and FIG. 9A is an assembly diagram of a circuit board and a light-emitting device in an optical module, in accordance with some embodiments; and FIG. 9B is an assembly diagram of a circuit board and a light-emitting device in an optical module from another perspective, in accordance with some embodiments.

As shown in FIGS. 8, 9A, and 9B, the circuit board 300 includes a mounting hole 320. The base 410 of the light-emitting device 400 is installed on the front surface of the circuit board 300, and the installation surface of the base 410 faces towards the front surface of the circuit board 300. The laser 420, the first collimating lens 430, and the translation prism 440 of the light-emitting device 400 are embedded in the mounting hole 320. In this way, after the circuit board 300 and the light-emitting device 400 are installed, the laser 420 and the first collimating lens 430 are located at a back side of the circuit board 300, and the wavelength division multiplexers, the optical isolators, and the optical fiber couplers are located on a front side of the circuit board 300. A first portion of the translation prism 440 is located on the back side of the circuit board 300, and a second portion of the translation prism 440 is located on the front side of the circuit board 300.

As shown in FIGS. 10A and 10B, a plurality of lasers 420 emit laser beams respectively, and these laser beams are parallel to the back surface of the circuit board 300. A plurality of first collimating lenses 430 convert the plurality of laser beams emitted by the plurality of lasers 420 into a plurality of collimated light beams, and the plurality of collimated light beams are transmitted to the translation prism 440. The first reflective surface 441 and the second reflective surface 442 of the translation prism 440 reflect the plurality of collimated light beams, so that the plurality of laser beams located at the back side of the circuit board 300 is reflected to the front side of the circuit board 300. Then, the first wavelength division multiplexer 4510 combines four collimated light beams into the first composite light beam, and the second wavelength division multiplexer 4520 combines the remaining collimated light beams (i.e., the another four collimated light beams) into the second composite light beam.

The first reflective surface 441 of the translation prism 440 faces towards the plurality of first collimating lenses 430 and is located on the back side of the circuit board 300. The first reflective surface 441 is configured to reflect the plurality of collimated light beams parallel to the back side of the circuit board 300 into a plurality of collimated light beams perpendicular to the circuit board 300. The second reflective surface 442 of the translation prism 440 faces towards the first reflective surface 441 and is located on the front side of the circuit board 300. The second reflective surface 442 is configured to reflect the plurality of collimated light beams perpendicular to the circuit board 300 into a plurality of collimated light beams parallel to the front side of the circuit board 300.

In this way, the optical elements such as wavelength division multiplexers, optical isolators, and fiber couplers are all located on the front side of the circuit board 300, through the translation effect of the translation prism 440 on the plurality of collimated light beams, and maintain a suitable gap with the front surface of the circuit board 300. Therefore, the interference between these optical elements and the circuit board 300 may be avoided, so that the area of the mounting hole 320 in the circuit board 300 may be reduced, as a result, the arrangement area of the electronic components on the circuit board 300 may be increased and make the wiring of circuit board 300 easier.

By providing the installation surface of the base 410 towards the front surface of the circuit board 300 and placing the plurality of lasers 420 on the back side of the circuit board 300, so that a bottom surface of the light-emitting device 400 is proximate to the upper shell 201 and away from the lower shell 202. The installation manner is referred to as a reversed installation manner of the light-emitting device 400. In a case where the light-emitting device 400 is reversely installed on the front surface of the circuit board 300, the spacer 422 of the laser 420 is flush with the back surface of the circuit board 300, so that the connecting wire between the ground wire and the signal line on the spacer 422 and the circuit wiring on the back surface of the circuit board 300 is minimized, so as to ensure an excellent high-frequency signal transmission performance of the circuit board 300.

Figure 11A:
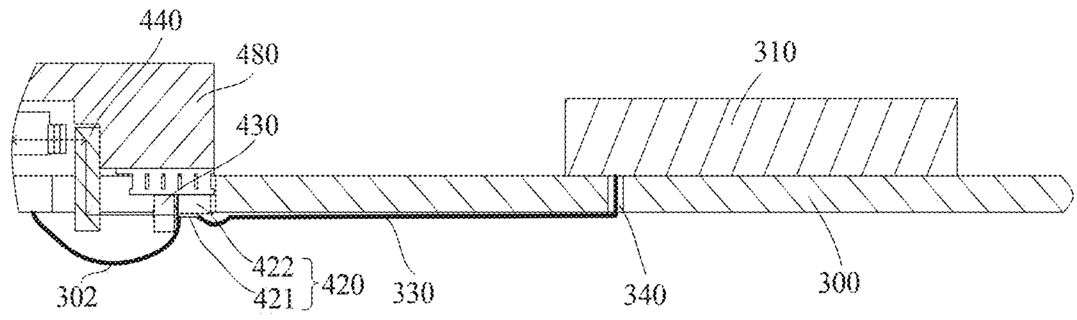
FIG. 11A is a diagram showing an electrical connection between a circuit board and a light-emitting device in an optical module, in accordance with some embodiments.
Figures 11B, 12A:
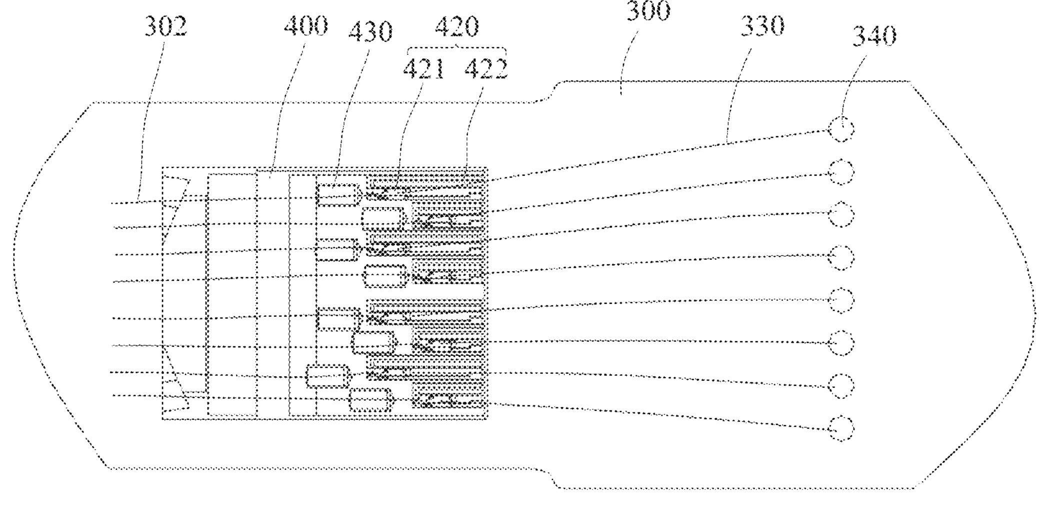
FIG. 11B is another diagram showing an electrical connection between a circuit board and a light-emitting device in an optical module, in accordance with some embodiments.
FIG. 12A is a structural diagram of a base in an optical module, in accordance with some embodiments.

FIG. 11A is a diagram showing an electrical connection between a circuit board and a light-emitting device in an optical module, in accordance with some embodiments; and FIG. 11B is another diagram showing an electrical connection between a circuit board and a light-emitting device in an optical module, in accordance with some embodiments. As shown in FIGS. 11A and 11B, the digital signal processing chip 310 is located on the front surface of the circuit board 300 and is configured to transmit a high-frequency signal to the laser 420 of the light-emitting device 400, so as to provide a signal for the laser beam emitted by the laser 420. In this way, the laser beam is modulated into an optical signal. In view of this, the circuit board 300 includes a high-frequency signal line 330 and a via hole 340. The via hole 340 is located at an output pad of the digital signal processing chip 310, and the via hole 340 runs through the front surface and the back surface of the circuit board 300. A portion of the high-frequency signal line 330 is located in the via hole 340, and the high-frequency signal line 330 is electrically connected to the output pad of the digital signal processing chip 310 through the via hole 340, so as to transmit the high-frequency signal.

Since the spacer 422 of the laser 420 is flush with the back surface of the circuit board 300, the high-frequency signal line 330 extends along the back surface of the circuit board 300 after passing through the via hole 340 and then is electrically connected to the laser 420 through a wire bonding process. That is, an end of the high-frequency signal line 330 is electrically connected to the output pad of the digital signal processing chip 310, and another end of the high-frequency signal line 330 is located at the back surface of the circuit board 300 and is electrically connected to the laser 420 through the wire bonding process. In this way, the high-frequency signal transmitted from the connecting finger 301 of the circuit board 300 passes through the digital signal processing chip 310 and then is transmitted to the laser 420 through the high-frequency signal line 330, so that the laser 420 may emit an optical signal.

In some embodiments, the digital signal processing chip 310 is further disposed on the back surface of the circuit board 300. In this case, an end of the high-frequency signal line 330 is electrically connected to the output pad of the digital signal processing chip 310, and another end of the high-frequency signal line 330 extends along the back surface of the circuit board 300 and is electrically connected to the laser 420 through the wire bonding process.

The circuit board 300 includes a plurality of via holes 340 and a plurality of high-frequency signal lines 330. The plurality of via holes 340 are disposed at a side of the mounting hole 320 proximate to the connecting finger 301. Each via hole 340 corresponds to a laser 420 and a high-frequency signal line 330, so that each high-frequency signal line 330 passing through a corresponding via hole 340 is connected to a corresponding laser 420.

The circuit board 300 further includes a direct current signal line 302 located on the back surface of the circuit board 300. The direct current signal line 302 is electrically connected to the laser 420 and transmits a bias current to drive the laser 420 to emit light. The direct current signal line 302 may be electrically connected to the laser 420 through the wire bonding process from a side of the mounting hole 320 in the circuit board 300 away from the connecting finger 301. The laser 420 emits a light beam after receiving the bias current transmitted by the direct current signal line 302. After the high-frequency signal transmitted through the high-frequency signal line 330 is transmitted to the laser 420, the laser 420 modulates the high-frequency signal into the light beam, so that the laser 420 generates an optical signal.

The direct current signal line 302 may also be connected to the laser 420 from other sides of the mounting hole 320, that is, the direct current signal line 302 connected to the laser 420 and the high-frequency signal line 330 are located on different sides of the mounting hole 320. In this way, the interference between the high-frequency signal and the direct current signal may be avoided, and the transmission path of the direct current signal may be shortened, so as to avoid overcrowded wiring in the circuit board 300.

Figure 12B:
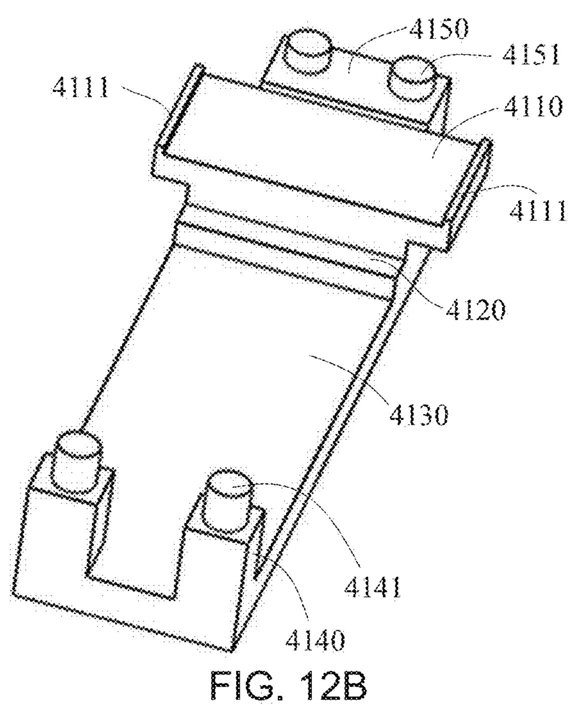
FIG. 12B is a structural diagram of the base in FIG. 12A from another perspective, in accordance with some embodiments.

FIG. 12A is a structural diagram of a base in an optical module, in accordance with some embodiments; and FIG. 12B is a structural diagram of the base in FIG. 12A from another perspective, in accordance with some embodiments. As shown in FIGS. 12A and 12B, the installation surface of the base 410 includes a first installation surface 4110, a second installation surface 4120, and a third installation surface 4130 connected in sequence, so as to carry the laser 420, the first collimating lens 430, and the translation prism 440, the wavelength division multiplexers, the optical isolators, the optical fiber couplers, and the thermo electric cooler 480.

The second installation surface 4120 is recessed from the first installation surface 4110 towards the bottom surface of the base 410, and the third installation surface 4130 is recessed from the second installation surface 4120 towards the bottom surface of the base 410. A distance between the third installation surface 4130 and the bottom surface of the base 410 is less than a distance between the second installation surface 4120 and the bottom surface of the base 410, and the distance between the second installation surface 4120 and the bottom surface of the base 410 is less than a distance between the first installation surface 4110 and the bottom surface of the base 410, so that the first installation surface 4110, the second installation surface 4120, and the third installation surface 4130 form a step-like surface.

In some embodiments, the first installation surface 4110, the second installation surface 4120, and the third installation surface 4130 each are all parallel to the bottom surface of the base 410. The base 410 further includes two baffles 4111 located at two sides of the first installation surface 4110 parallel to the light-emitting direction of the laser 420, respectively. The two baffles 4111 extend along a direction away from the bottom surface of the base 410, so that the two baffles 4111 abut against the front surface of the circuit board 300 in a case where the light-emitting device 400 is installed on the circuit board 300. The laser 420 and the first collimating lens 430 are fixed on the first installation surface 4110. The second installation surface 4120 is open in the predetermined direction, so as to facilitate fixing the translation prism 440 on the second installation surface 4120. The third installation surface 4130 is open in the predetermined direction and is also open in the light-emitting direction of the laser 420, so as to facilitate fixing the wavelength division multiplexers, the optical isolators, and the optical fiber couplers on the third installation surface 4130.

In this way, in a case where a plane where the bottom surface of the base 410 is located is used as a reference plane, installation heights of the laser 420 and the first collimating lens 430 on the base 410 is greater than an installation height of the translation prism 440, and the installation height of the translation prism 440 is greater than installation heights of the wavelength division multiplexers, the optical isolators, and the optical fiber couplers. In this way, after the laser 420, the first collimating lens 430, and the translation prism 440 are embedded in the mounting hole 320 of the circuit board 300, the laser 420 and the first collimating lens 430 are located at the back side of the circuit board 300, and the wavelength division multiplexers, the optical isolators, and the optical fiber couplers are located at the front side of the circuit board 300. A first portion of the translation prism 440 is located at the back side of the circuit board 300, and a second portion of the translation prism 440 is located at the front side of the circuit board 300.

The thermo electric cooler 480 is disposed on the first installation surface 4110, and the plurality of lasers 420 are disposed on the thermo electric cooler 480. The spacer 422 is disposed on the thermo electric cooler 480. The first collimating lens 430 corresponding to the laser 420 is also disposed on the thermo electric cooler 480, and the first collimating lens 430 is disposed in the light-emitting direction of the corresponding laser 420.

In some embodiments, in a case where the light-emitting device includes eight lasers 420 and eight first collimating lenses 430, the eight lasers 420 are arranged side by side in the predetermined direction. The eight first collimating lenses 430 are also arranged side by side in the predetermined direction, so that the eight lasers 420 emit eight light beams with different wavelengths.

In some embodiments, dimensions of the eight lasers 420 along their respective light-emitting directions may be the same, and the distances between the eight first collimating lenses 430 and a side of the first installation surface 4110 away from the second installation surface 4120 are the same. However, the present disclosure is not limited thereto. In some other embodiments, the dimensions of the eight lasers 420 along their respective light-emitting directions may also be different from each other. In the light-emitting direction of the laser 420, lengths of a part of the lasers 420 (first lasers) extending from the side of the first installation surface 4110 away from the second installation surface 4120 are less than lengths of another part of the lasers 420 (second lasers) extending from the side of the first installation surface 4110 away from the second installation surface 4120, so that the eight lasers 420 are fixed on the thermo electric cooler 480 in an alternating manner between the first laser and the second laser (e.g., a sequence of short, long, short, long, short, long, short, long).

In this case, the distances between the eight first collimating lenses 430 and a side of the first installation surface 4110 away from the second installation surface 4120 are also different from each other, so that the plurality of first collimating lenses 430 will not affect each other during assembly due to the flow of glue. In this way, the distances between the plurality of collimated light beams may be reduced, so as to reduce an outline dimension of the base 410, for example, a dimension of the base 410 in the predetermined direction. Therefore, the interference generated during assembly between the light-emitting device 400 and the light-receiving device 500 may be avoided.

In some embodiments, in the predetermined direction, the dimension of the first installation surface 4110 is slightly greater than the dimension of the second installation surface 4120, and the dimension of the second installation surface 4120 is substantially equal to the dimension of the third installation surface 4130. In a case where the plurality of lasers 420 are fixed side by side on the first installation surface 4110 in the predetermined direction, the wider first installation surface 4110 may facilitate the placement of the plurality of lasers 420, so that a distance between adjacent two lasers 420 may be increased, and crosstalk between the plurality of laser beams emitted by the plurality of lasers 420 may be avoided.

The translation prism 440 is provided on the second installation surface 4120. The translation prism 440 is vertically fixed on the second installation surface 4120, and the first reflective surface 441 of the translation prism 440 is farther away from the second installation surface 4120 and closer to the laser 420 than the second reflective surface 442. The second reflective surface 442 of the translation prism 440 is closer to the second installation surface 4120 than the first reflective surface 441. In this way, the laser beam at the back side of the circuit board 300 may be reflected to the front side of the circuit board 300 through the translation prism 440.

The wavelength division multiplexers, the optical isolators, and the optical fiber couplers are provided on the third installation surface 4130. In the predetermined direction, the first wavelength division multiplexer 4510 and the second wavelength division multiplexer 4520 are arranged side by side, the first optical isolator 4610 and the second optical isolator 4620 are also arranged side by side, and the first optical fiber coupler 4710 and the second optical fiber coupler 4720 are also arranged side by side. In addition, the wavelength division multiplexers, the optical isolators, and the optical fiber couplers are arranged along the light-emitting direction of the laser 420.

In some embodiments, in the predetermined direction, the dimension of the third installation surface 4130 is consistent along the light-emitting direction of the laser 420, and the dimension of the third installation surface 4130 is less than the dimension jointly formed by the first wavelength division multiplexer 4510 and the second wavelength division multiplexer 4520 arranged side by side. In this way, in a case where the first wavelength division multiplexer 4510 and the second wavelength division multiplexer 4520 are arranged side by side on the third installation surface 4130 in the predetermined direction, the side of the first wavelength division multiplexer 4510 away from the second wavelength division multiplexer 4520 and the side of the second wavelength division multiplexer 4520 away from the first wavelength division multiplexer 4510 protrude from the first installation surface 4110, so that the dimension of the base 410 in the predetermined direction may be reduced, thereby saving costs.

The thermo electric cooler 480, the laser 420, the first collimating lens 430, the translation prism 440, the wavelength division multiplexers, the optical isolators, and the optical fiber couplers are fixed on the base 410 through the step-like first installation surface 4110, second installation surface 4120, and third installation surface 4130, so as to form the installation height difference between the laser 420, the first collimating lens 430, and the wavelength division multiplexers, the optical isolators, and the optical fiber coupler. In this way, the laser 420 and the first collimating lens 430 with rather large installation heights are disposed at the back side of the circuit board 300 through the mounting hole 320 of the circuit board 300, and the wavelength division multiplexers, the optical isolators, and the optical fiber couplers with rather low installation heights are disposed at the front side of the circuit board 300, so as to reduce the spatial overlapping region between the light-emitting device 400 and the circuit board 300.

When assembling the light-emitting device 400, firstly, the thermo electric cooler 480 is installed on the first installation surface 4110, and the laser 420 is fixed on the thermo electric cooler 480. Then, the translation prism 440 is fixed on the second installation surface 4120. And then, the wavelength division multiplexers, the optical isolators, and the optical fiber couplers are independently fixed on the third installation surface 4130 according to the light-emitting direction of the laser 420. Finally, the first collimating lens 430 is fixed on the first installation surface 4110 through an active coupling manner along the light-emitting direction of the laser 420. The active coupling means that in a state where the laser chip 421 is energized and emits light, the first collimating lens 430 is mounted. Meanwhile, the coupling efficiency in the internal sub-optical fibers 801 and 802 is detected, and the position of the first collimating lens 430 may be optimized.

In order to reduce the assembly workload, the first wavelength division multiplexer 4510, the second wavelength division multiplexer 4520, the first optical isolator 4610, the second optical isolator 4620, the first optical fiber coupler 4710, the second optical fiber coupler 4720, the first internal sub-optical fiber 801, the second internal sub-optical fiber 802, the first optical fiber sub-adapter 601, and the second optical fiber sub-adapter 602 are assembled into a pre-assembled member. The thermo electric cooler 480 is firstly fixed on the first installation surface 4110, and the laser 420 is fixed on the thermo electric cooler 480. Then, the translation prism 440 is fixed on the second installation surface 4120, and the pre-assembled member is fixed on the third installation surface 4130. Finally, the first collimating lens 430 is fixed on the first installation surface 4110 through the active coupling manner along the light-emitting direction of the laser 420, and the position of the first collimating lens 430 may be optimized.

After fixing the thermo electric cooler 480, the laser 420, the first collimating lens 430, the translation prism 440, the wavelength division multiplexers, the optical isolators, and the optical fiber couplers on the base 410, the base 410 is reversely installed on the front surface of the circuit board 300. That is, the bottom surface of the base 410 faces towards the upper shell 201, and the first installation surface 4110, the second installation surface 4120, and the third installation surface 4130 of the base 410 face towards the front surface of the circuit board 300.

In order to fix the base 410 on the front surface of the circuit board 300, the base 410 further includes two first supporting columns 4140. The two first supporting columns 4140 are proximate to an end of the third installation surface 4130 away from the second installation surface 4120. There is an opening between the two first supporting columns 4140, and the two internal sub-optical fibers 801 and 802 respectively connected to the first optical fiber coupler 4710 and the second optical fiber coupler 4720 are connected to the corresponding optical fiber sub-adapters 601 and 602 through the opening. In the predetermined direction, a distance between the two first supporting columns 4140 is less than or equal to the dimension of the third installation surface 4130. For example, the surfaces of the two first supporting columns 4140 facing away from each other are flush with the side surfaces of the base 410.

The first supporting column 4140 extends from the third installation surface 4130 to a direction away from the bottom surface of the base 410. The base 410 further includes two first positioning pins 4141 located on end surfaces of the two first supporting columns 4140 facing away from the third installation surface 4130, respectively. Referring to FIG. 9B, the circuit board 300 includes first positioning holes 360, and the first positioning holes 360 are disposed corresponding to the first positioning pins 4141.

In some embodiments, referring to FIG. 12A, the base 410 further includes a positioning block 4150 located at an end of the first installation surface 4110 away from the optical fiber sub-adapters 601 and 602. The positioning block 4150 extends along a direction away from the bottom surface of the base 410 and protrudes from the first installation surface 4110. The base 410 further includes two positioning protrusions 4151 located on an end surface of the positioning block 4150 facing away from the bottom surface of the base 410. The circuit board 300 includes second positioning holes 370 (referring to FIG. 8), and the second positioning holes 370 are disposed corresponding to the positioning protrusions 4151.

When the base 410 is reversely installed on the front surface of the circuit board 300, the first supporting columns 4140 and the positioning block 4150 of the base 410 are in contact with the front surface of the circuit board 300, the first positioning pins 4141 of the first supporting columns 4140 are inserted into the first positioning holes 360 in the circuit board 300, and the positioning protrusions 4151 of the positioning block 4150 are inserted into the second positioning holes 370 in the circuit board 300. Therefore, the base 410 is fixed on the circuit board 300, and the laser 420 and the first collimating lens 430 disposed on the first installation surface 4110 and the translation prism 440 disposed on the second installation surface 4120 are embedded in the mounting hole 320 of the circuit board 300.

Figure 13:
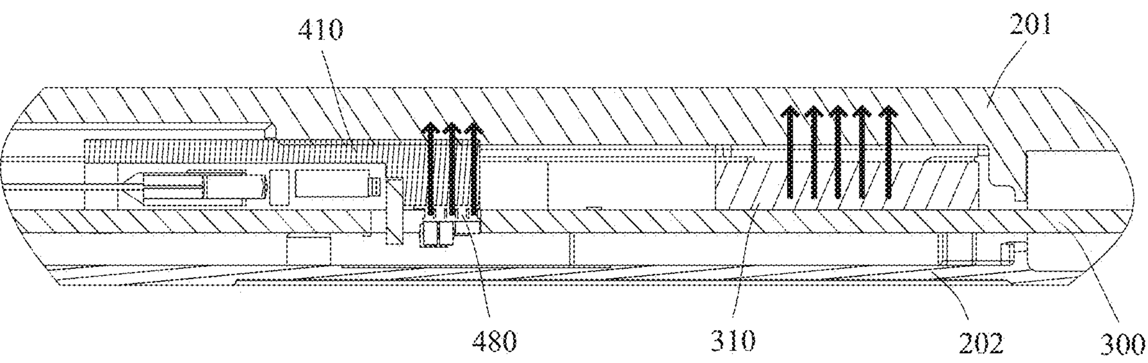
FIG. 13 is a diagram showing a heat dissipation channel of an optical module, in accordance with some embodiments.

FIG. 13 is a diagram showing a heat dissipation channel of an optical module, in accordance with some embodiments. As shown in FIG. 13, after the light-emitting device 400 is reversely installed on the front surface of the circuit board 300, the bottom surface of the base 410 of the light-emitting device 400 faces towards the upper shell 201 and is in contact with the upper shell 201. After connecting the laser 420 (i.e., a laser assembly) of the light-emitting device 400 to the digital signal processing chip 310 on the front surface of the circuit board 300 through the high-frequency signal line 330, the laser 420 generates an optical signal due to the driving of the bias current and the high-frequency signal and generates heat simultaneously. However, the light-emitting performance of the laser 420 is easily affected by temperature. Therefore, the laser 420 needs to operate within a certain fixed temperature range. The operating temperature of the laser 420 will be ensured to be within the fixed temperature range by disposing the laser 420 on the thermo electric cooler 480. In this way, the heat may be transferred to the thermo electric cooler 480 from the laser 420. Therefore, the heat needs to be transferred out of the thermo electric cooler 480 to ensure the cooling efficiency of the thermo electric cooler 480.

The heat generated by the laser 420 will be transferred to the base 410 through the thermo electric cooler 480 to maintain the temperature of the laser 420. In order to improve the heat dissipation performance of the optical module, the base 410 may be made of tungsten copper or other metal materials with good thermal conductivity. Moreover, the quality of the base 410 and the area of the bottom surface of the base 410 may be appropriately increased. In this way, the heat generated by the laser 420 may be transferred to the upper shell 201 through the base 410, so that the heat dissipation effect of the laser 420 may be effectively improved.

The laser 420 is disposed on the first installation surface 4110 of the base 410 through the thermo electric cooler 480. The installation area of the laser 420 on the base 410 is less than the contact area between the base 410 and the upper shell 201, so that the heat dissipation efficiency of the laser 420 may be effectively improved.

In order to ensure that the operating temperature of the laser is within the fixed temperature range, the quality of the base 410 and the contact area between the base 410 and the upper shell 201 are increased in some embodiments, so that the contact area between the base 410 and the upper shell 201 is greater than the installation area of the laser 420 on base 410. In this way, the heat generated by the laser 420 is transferred to the thermo electric cooler 480, transferred to the base 410 through the thermo electric cooler 480, and then transferred to the upper shell 201 through the base 410, so that the heat generated by the laser 420 is transferred to the outside of the optical module 200.

The optical module 200 further includes a first heat conducting pad. In order to facilitate the conduction of the heat from the base 410 to the upper shell 201, the first heat conducting pad is disposed between the bottom surface of the base 410 and an inner bottom surface of the upper shell 201. In this way, the heat of the base 410 may be transferred to the first heat conducting pad and transferred to the upper shell 201 through the first heat conducting pad, so as to effectively improve the heat dissipation effect.

In some embodiments, the first heat conducting pad includes a heat conducting glue. The base 410 may not only be adhered on the inner bottom surface of the upper shell 201, but also the heat of the base 410 may be transferred to the upper shell 201 through the heat conducting glue.

In some embodiments, the main heat source of the optical module further includes the digital signal processing chip 310 other than the laser 420. A surface of the digital signal processing chip 310 facing away from the circuit board 300 is in contact with the upper shell 201. In this way, the heat generated by the operation of the digital signal processing chip 310 may be transferred to the upper shell 201, so as to transfer the heat generated by the digital signal processing chip 310 to the outside of the optical module 200.

The optical module 200 further includes a second heat conducting pad. In order to facilitate the conduction of the heat from the digital signal processing chip 310 to the upper shell 201, the second heat conducting pad is disposed between the digital signal processing chip 310 and the inner bottom surface of the upper shell 201. In this way, the heat generated by the digital signal processing chip 310 is transferred to the second heat conducting pad and transferred to the upper shell 201 through the second heat conducting pad, so as to effectively improve the heat dissipation effect.

Figure 14A:
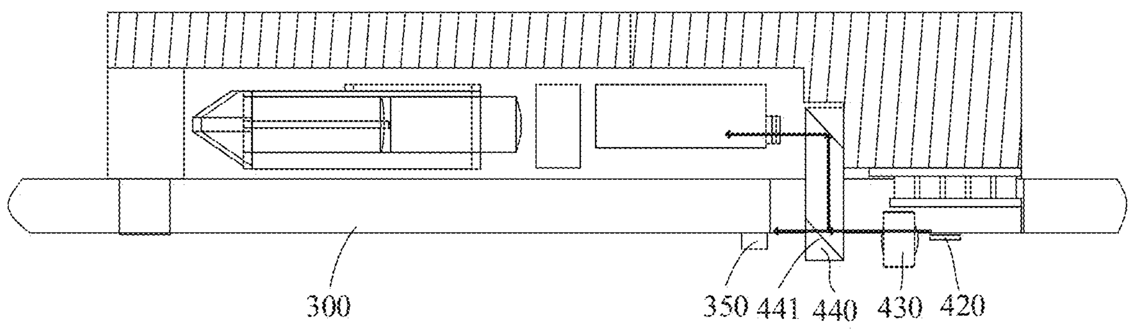
FIG. 14A is a cross-sectional view of an optical module showing a monitoring optical path of a photodetector, in accordance with some embodiments.
Figure 14B:
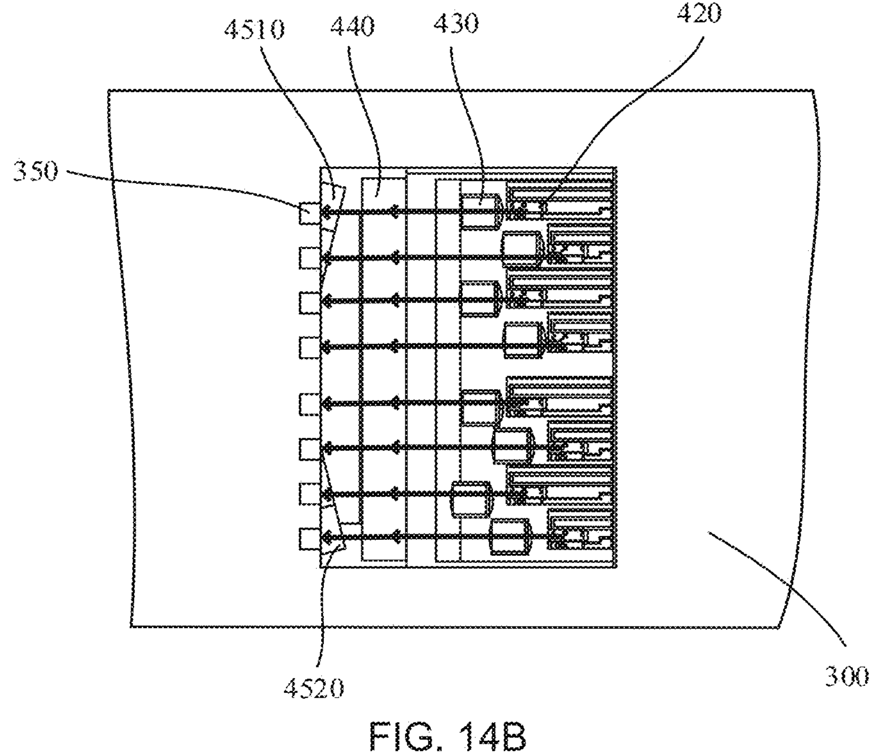
FIG. 14B is a top view of monitoring optical paths of photodetectors in an optical module, in accordance with some embodiments.

FIG. 14A is a cross-sectional view of an optical module showing a monitoring optical path of a photodetector, in accordance with some embodiments; and FIG. 14B is a top view of monitoring optical paths of photodetectors in an optical module, in accordance with some embodiments. As shown in FIGS. 14A and 14B, the laser 420 emits an optical signal due to the driving of the bias current and high-frequency signal transmitted by the circuit board 300. In order to monitor an emitted optical power of the laser 420, the circuit board 300 further includes a photodetector 350 disposed on the back surface of the circuit board 300. The photodetector 350 is located on a side of the mounting hole 320 away from the connecting finger 301, and a photosensitive surface of the photodetector 350 faces towards the light-emitting direction of the laser 420. The photodetector 350 is configured to collect a forward light beam emitted by the laser 420 and send collected data to the circuit board 300, so as to implement monitoring of a forward emitted optical power of the laser 420.

When mounting the photodetector 350 on the side of the mounting hole 320 away from the connecting finger 301, the photosensitive surface of the photodetector 350 may be flush with an inner wall of the mounting hole 320 along a thickness direction of the optical module, so as to facilitate positioning the photodetector 350. In some embodiments, at least a portion of the photosensitive surface of the photodetector 350 may protrude from the inner wall of the mounting hole 320, so as to reduce a distance between the photosensitive surface of the photodetector 350 and the first reflective surface 441. In this way, the photodetector 350 is capable of collecting the laser beam passing through the first reflective surface 441 as much as possible.

In some embodiments, by using a light transmission characteristic of the first reflective surface 441 of the translation prism 440, a little portion of the collimated light beam passes through the first reflective surface 441 and is incident on the photosensitive surface of the photodetector 350, so that the photodetector 350 may receive the little portion of the collimated light beam, so as to obtain the emitted optical power of the laser 420.

For example, the first reflective surface 441 of the translation prism 440 faces towards the light-emitting direction of the laser 420 and is configured to split the laser beam generated by the laser 420 into two light beams. One of the two light beams (generally accounting for 95% of the total power of the laser) is reflected to the second reflective surface 442 by the first reflective surface 441, so that the laser beam is reflected from the back side of the circuit board 300 to the front side of the circuit board 300. Another of the two light beams passes through the first reflective surface 441 and is incident on the photosensitive surface of the photodetector 350. The photosensitive surface receives the laser beam emitted by the laser 420.

When the photodetector 350 is disposed on the back surface of the circuit board 300, a central axis of the photosensitive surface of the photodetector 350 may be set to be coincident with a central axis of the laser 420, and the photodetector 350 may be mounted on the back surface of the circuit board 300 through a surface mounted technology (SMT), so that the light beam passing through the first reflective surface 441 is incident on the photodetector 350 as much as possible.

In some embodiments, the circuit board 300 includes eight photodetectors 350, and each photodetector 350 is disposed correspondingly to a laser 420. In this way, each photodetector 350 collects a portion of a laser beam emitted by a corresponding laser 420 passing through the first reflective surface 441 and detects the forward emitted optical power of the corresponding laser 420.

The photodetector 350 receives a parallel light beam with a certain area, therefore, the assembly position accuracy requirement of the photodetector 350 is low, thereby making the assembly easier. After a light transmission region of the first reflective surface 441 of the translation prism 440 is aligned with the photosensitive surface of the photodetector 350, the photodetector 350 may collect the laser beam passing through the first reflective surface 441.

The photodetector 350 has a cathode and an anode. When the photodetector 350 is fixed on the back surface of the circuit board 300, the cathode may be fixed on a grounded metal layer of the circuit board 300 through welding or adhesive bonding with conductive glue. The anode and the cathode of the photodetector 350 are disposed opposite to each other, and the anode is electrically connected to the circuit board 300 through a wire bonding process, thereby realizing the electrical connection between the photodetector 350 and the circuit board 300.

Figure 15A:
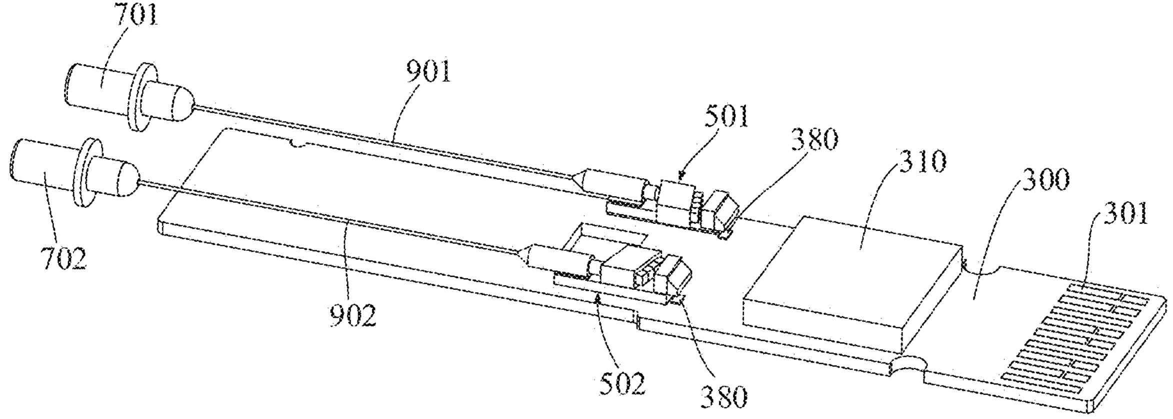
FIG. 15A is an assembly diagram of a circuit board and a light-receiving device in an optical module, in accordance with some embodiments.

FIG. 15A is an assembly diagram of a circuit board and a light-receiving device in an optical module, in accordance with some embodiments. As shown in FIGS. 15A and 5, the light-receiving device 500 of the 800G (that is, the signal transmission rate of the optical module is 800G bit/s) optical module in some embodiments of the present disclosure includes two light-receiving sub-devices 501 and 502. The first light-receiving sub-device 501 and the second light-receiving sub-device 502 may be symmetrically disposed at both sides of the mounting hole 320 of the circuit board 300 in the predetermined direction. The first light-receiving sub-device 501 is connected to the third optical fiber sub-adapter 701 through the third internal optical fiber 901, and a third composite light beam received by the third optical fiber sub-adapter 701 from the outside of the optical module 200 is transmitted to the first light-receiving sub-device 501 through the third internal optical fiber 901, so as to implement reception of the third composite light beam. The second light-receiving sub-device 502 is connected to the fourth optical fiber sub-adapter 702 through the fourth internal optical fiber 902, and a fourth composite light beam received by the fourth optical fiber sub-adapter 702 from the outside of the optical module 200 is transmitted to the second light-receiving sub-device 502 through the fourth internal optical fiber 902, so as to implement reception of the fourth composite light beam.

Figure 15B:
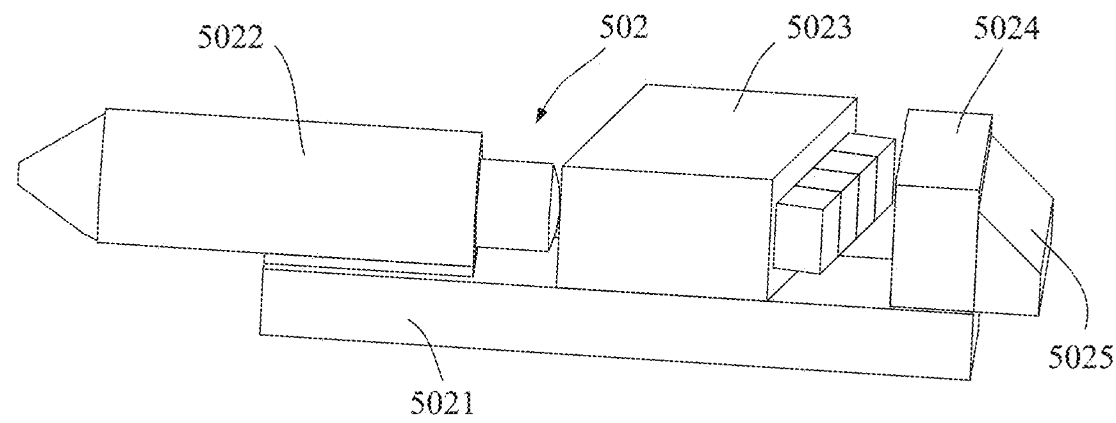
FIG. 15B is a structural diagram of a light-receiving device in an optical module, in accordance with some embodiments.
Figure 15C:
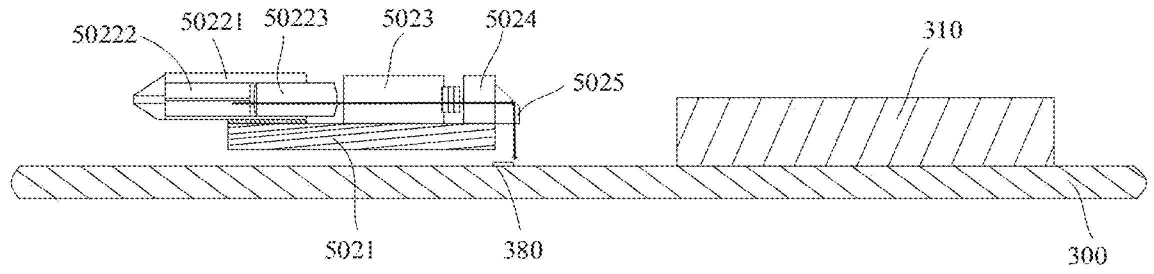
FIG. 15C is a diagram showing a partial optical path of a light-receiving device in an optical module, in accordance with some embodiments.

FIG. 15B is a structural diagram of a light-receiving device in an optical module, in accordance with some embodiments; and FIG. 15C is a diagram showing a partial optical path of a light-receiving device in an optical module, in accordance with some embodiments. As shown in FIGS. 15B and 15C, the structure of the first light-receiving sub-device 501 is similar to that of the second light-receiving sub-device 502, and the second light-receiving sub-device 502 includes a supporting plate 5021 and an optical collimator 5022, a wavelength division de-multiplexer 5023, a lens array 5024, and a reflective prism 5025 disposed on the supporting plate 5021. A combination formed by the optical collimator 5022, the wavelength division de-multiplexer 5023, the lens array 5024, and the reflective prism 5025 may also be referred to as the above light-receiving device. The fourth internal optical fiber 902 connected to the fourth optical fiber sub-adapter 702 is inserted into the optical collimator 5022. The fourth composite light beam from the outside of the optical module 200 is transmitted to the wavelength division de-multiplexer 5023 through the optical collimator 5022 and then demultiplexed into four laser beams by the wavelength division de-multiplexer 5023. The four laser beams are converged to the reflective prism 5025 respectively through the lens array 5024. The four laser beams are reflected at a reflective surface of the reflective prism 5025. The reflective surface of the reflective prism 5025 reflects the laser beams parallel to the front surface of the circuit board 300 into laser beams perpendicular to the front surface of the circuit board 300 and makes the reflected laser beams to be incident on receiving detectors 380 on the circuit board 300, so as to implement light reception.

The optical collimator 5022 includes a third sleeve 50221, a third single-mode optical fiber flange 50222, and a second collimating lens 50223, and the third single-mode optical fiber flange 50222 and the second collimating lens 50223 each are inserted into the third sleeve 50221. The fourth internal optical fiber 902 is inserted into the third single-mode optical fiber flange 50222 and is disposed opposite to the second collimating lens 50223. The second collimating lens 50223 is configured to convert the composite light beam transmitted by the fourth internal optical fiber 902 from the outside of the optical module 200 into a collimated composite light beam.

The light incident surface of the wavelength division de-multiplexer 5023 faces towards the light exit surface of the second collimating lens 50223, and the wavelength division de-multiplexer 5023 is configured to demultiplex the collimated composite light beam output by the second collimating lens 50223 into four laser beams, thereby separating a plurality of light beams with different wavelengths. The wavelength division de-multiplexer 5023 outputs four light beams with different wavelengths, and the four light beams with different wavelengths respectively are incident on corresponding lenses in the lens array 5024, so that the four light beams with different wavelengths is converged onto the reflective surface of the reflective prism 5025. The reflective prism 5025 is disposed above the receiving detectors 380, and the reflective prism 5025 reflects the four light beams with different wavelengths into the corresponding receiving detectors 380, so that the optical signals are converted into electrical signals through the receiving detectors 380.

A transimpedance amplifier of the circuit board 300 is connected to the receiving detector 380 through circuit wiring. The receiving detector 380 first converts the received optical signal into a high-frequency current signal and then transmits the high-frequency current signal to the transimpedance amplifier. The transimpedance amplifier converts the high-frequency current signal into a high-frequency voltage signal, amplifies the high-frequency voltage signal and transmits the high-frequency voltage signal to the digital signal processing chip 310 through the high-frequency signal line 330. The digital signal processing chip 310 extracts data from the high-frequency voltage signal and then transmits the data to the optical network terminal 100 (i.e., the master monitor 100) through the connecting finger 301.

In some embodiments of the present disclosure, an end of the transimpedance amplifier is connected to the receiving detector 380 through a circuit wiring, and another end of the transimpedance amplifier is connected to the digital signal processing chip 310 through the high-frequency signal line 330. The high-frequency current signal converted by the receiving detector 380 is converted into the high-frequency voltage signal and amplified by the transimpedance amplifier and then transmitted to the digital signal processing chip 310 through the high-frequency signal line 330. The digital signal processing chip 310 processes the amplified high-frequency voltage signal.

In some embodiments, the light-receiving device may also use a wavelength division de-multiplexer based on arrayed waveguide grating (AWG) technology to achieve the same optical splitting effect.

In some embodiments, an installation method of the first light-receiving sub-device 501 is similar to that of an installation method of the second light-receiving sub-device 502, and the following is mainly described by considering the installation method of the second light-receiving sub-device 502 as an example. The optical collimator 5022, the wavelength division de-multiplexer 5023, the lens array 5024, and the reflective prism 5025 are fixedly installed on the supporting plate 5021 in sequence and assembled into a pre-assembled assembly. Then the pre-assembled assembly is fixed on the circuit board 300 in an active coupling manner, so as to ensure that the reflective prism 5025 of the pre-assembled assembly couples a plurality of optical signals to the receiving detectors 380.

When fixing the second light-receiving sub-device 502 on the circuit board 300, glue is used to fill a gap between the supporting plate 5021 and the circuit board 300. In this way, after installation, there is a height difference between the optical collimator 5022, the wavelength division de-multiplexer 5023, the lens array 5024, and the reflective prism 5025 of the second light-receiving sub-device 502, and the receiving detectors 380.

The first light-receiving sub-device 501 and the second light-receiving sub-device 502 are installed on the front surface of the circuit board 300 in a symmetrical structure, so that the optical module 200 forms a complementary structure in layout. Therefore, the positional interference between the components is avoided, and the overall structure is compact, which is convenient for installation.

In the optical module provided by some embodiments of the present disclosure, the use of the translation prisms reduces the area of the mounting hole in the circuit board, which facilitates layout and design of the circuit board. In addition, the use of integrated optical elements, such as the wavelength division multiplexer, the optical isolator, and/or the optical fiber coupler, simplify the assembly difficulty of the optical elements. The light-emitting device uses a reverse installation manner, which reduces the overall size of the light-emitting device and greatly improves the heat dissipation performance of the light-emitting device. The spaced arrangement of the plurality of lasers with different dimensions in the light-emitting device greatly reduces the distance between two adjacent lasers and reduces the dimension of the light-emitting device in the light-emitting direction of the lasers.

It will be noted that the present disclosure is not limited to the examples described above. That is, appropriate changes may also be made to the examples above. Hereinafter, some representative examples will be described. In the following description of the embodiments, only the parts different from the above examples will be described. In addition, in the above examples and embodiments, the same reference signs are assigned to components that are identical or equivalent to each other. Therefore, in the following description of the embodiments, as long as there is no technical contradiction or special additional explanation about the constituent elements with the same reference signs as those in the above examples, the descriptions in the above examples may be referred accordingly.

Figure 16A:
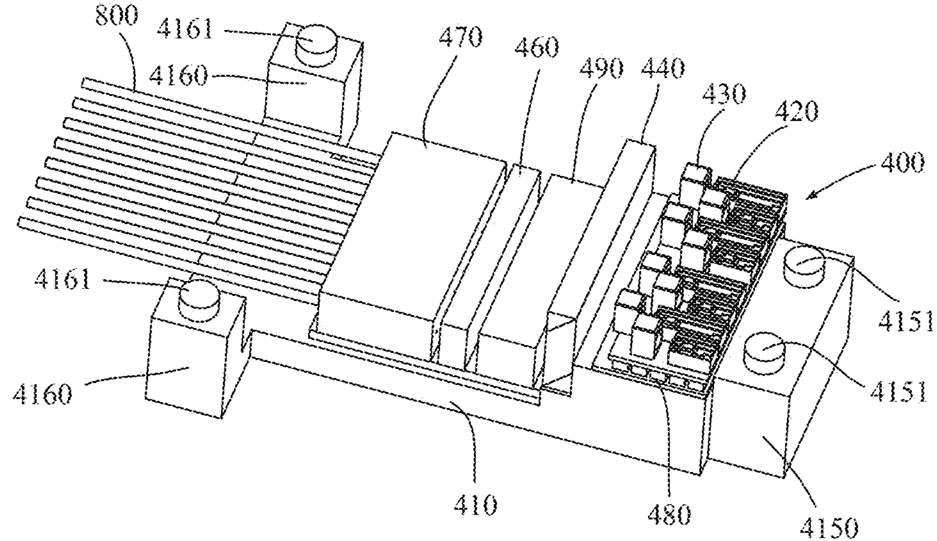
FIG. 16A is a structural diagram of another light-emitting device in an optical module, in accordance with some embodiments.

FIG. 16A is a structural diagram of another light-emitting device in an optical module, in accordance with some embodiments; and FIG. 16B is a structural diagram of a base in a light-emitting device shown in FIG. 16A. As shown in FIG. 16A, the light-emitting device 400 includes lasers 420, first collimating lenses 430, a translation prism 440, a converging lens 490, an optical isolator 460, an optical fiber coupler 470, and a thermo electric cooler 480. The light-emitting device 400 omits the wavelength division multiplexers, and eight optical signals are transmitted to the outside of the optical module 200 through eight internal optical fibers. The converging lens 490 converges the collimated light beams passing through the translation prism 440 to form converging light beams, the converging light beams are incident on the optical fiber coupler 470.

As shown in FIGS. 16A and 16B, in order to fix the base 410 on the front surface of the circuit board 300, the base 410 omits the first supporting columns 4140. In this case, the base 410 includes two second supporting columns 4160. The two second supporting columns 4160 are proximate to the end of the third installation surface 4130 away from the second installation surface 4120. There is an opening between the two second supporting columns 4160, and the eight internal optical fibers connected to the optical fiber coupler 470 are connected to corresponding optical fiber adapters through the opening. In the predetermined direction, a distance between the two second supporting columns 4160 is greater than the dimension of the third installation surface 4130, so as to facilitate the eight internal optical fibers to pass through the opening.

As shown in FIG. 16A, each second supporting column 4160 extends from the third installation surface 4130 to the direction away from the bottom surface of the base 410. The base 410 further includes two second positioning pins 4161 located on end surfaces of the two second supporting columns 4160 facing away from the bottom surface of the base 410, respectively. The circuit board 300 includes first positioning holes 360 disposed corresponding to the second positioning pins 4161.

In a case where the base 410 is reversely installed on the front surface of the circuit board 300, the second supporting columns 4160 and the positioning block 4150 of the base 410 are in contact with the front surface of the circuit board 300, the second positioning pins 4161 on the second supporting columns 4160 are inserted into the first positioning holes 360 in the circuit board 300, and the positioning protrusions 4151 on the positioning block 4150 are inserted into the second positioning holes 370 in the circuit board 300. Therefore, the base 410 is fixed on the circuit board 300, and the lasers 420 and the first collimating lenses 430 disposed on the first installation surface 4110 and the translation prism 440 disposed on the second installation surface 4120 are embedded in the mounting hole 320 of the circuit board 300.

FIG. 17A is a structural diagram of yet another light-emitting device in an optical module, in accordance with some embodiments; and FIG. 17B is a structural diagram of a base in the light-emitting device shown in FIG. 17A. As shown in FIGS. 17A and 17B, in order to fix the base 410 on the front surface of the circuit board 300, the base 410 omits the first supporting columns 4140, but includes a supporting block 4170 extending from the third installation surface 4130 to the direction away from the bottom surface of the base 410. The supporting block 4170 is proximate to the end of the third installation surface 4130 away from the second installation surface 4120, and a side of the supporting block 4170 away from the second installation surface 4120 is flush with the side of the base 410 away from the first installation surface 4110.

The supporting block 4170 has two through holes 4171. The two through holes 4171 are disposed side by side in the predetermined direction and run through the supporting block 4170 along the light-emitting direction of the laser 420. The first optical fiber coupler 4710 and the second optical fiber coupler 4720 are inserted into the two through holes 4171 in the supporting block 4170, so that the first optical fiber coupler 4710 and the second optical fiber coupler 4720 are fixed on the base 410 through the supporting block 4170.

In some embodiments, in the predetermined direction, a dimension of the supporting block 4170 is less than or equal to the dimension of the third installation surface 4130, thereby facilitating the processing of the base 410, and saving the production costs.

In a case where the base 410 is reversely installed on the front surface of the circuit board 300, the supporting block 4170 and the positioning block 4150 of the base 410 are in contact with the front surface of the circuit board 300, and the positioning protrusions 4151 on the positioning block 4150 are inserted into the second positioning holes 370 in the circuit board 300. Therefore, the base 410 is fixed on the circuit board 300, and the lasers 420 and the first collimating lenses 430 disposed on the first installation surface 4110 and the translation prism 440 disposed on the second installation surface 4120 are embedded in the mounting hole 320 of the circuit board 300.

Figure 18A:
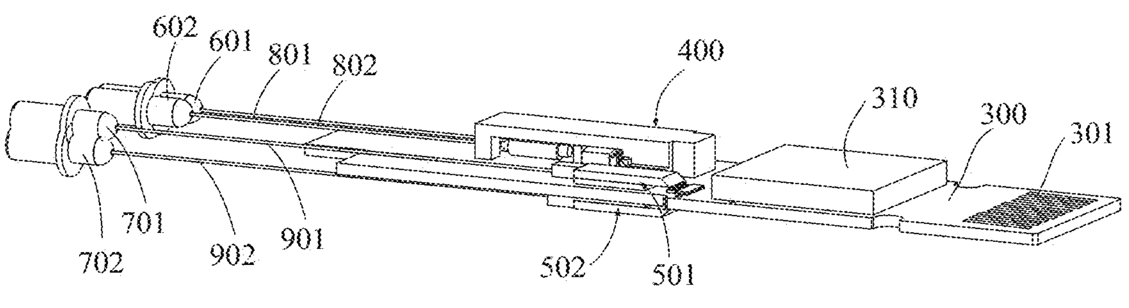
FIG. 18A is an assembly diagram of a circuit board, a light-emitting device, and a light-receiving device in an optical module, in accordance with some embodiments.
Figure 18B:
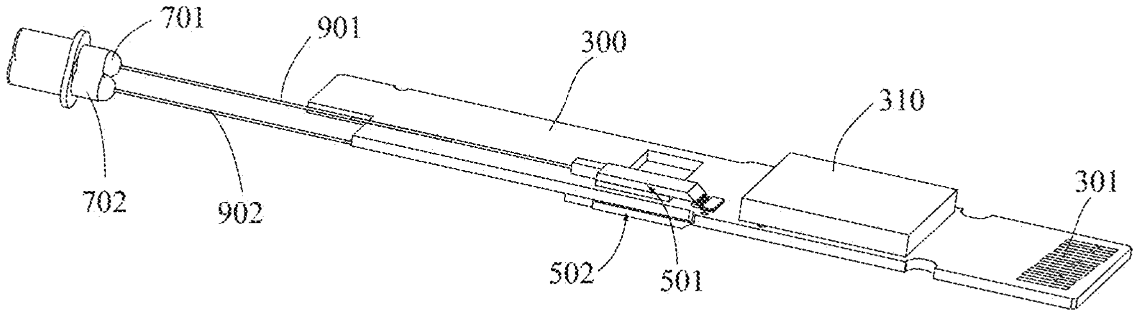
FIG. 18B a structural diagram of an optical module shown in FIG. 18A without the light-emitting device.

FIG. 18A is an assembly diagram of a circuit board, a light-emitting device, and a light-receiving device in an optical module, in accordance with some embodiments; and FIG. 18B a structural diagram of an optical module shown in FIG. 18A without the light-emitting device. As shown in FIGS. 18A and 18B, in order to reduce the dimension of the circuit board 300 in the predetermined direction, the light-emitting device 400 may be reversely installed on the front surface of the circuit board 300. The first light-receiving sub-device 501 may be installed on the front surface of the circuit board 300 and is located on a side of the light-emitting device 400. The second light-receiving sub-device 502 may be installed on the back surface of the circuit board 300. In addition, the first light-receiving sub-device 501 is disposed symmetrically with the second light-receiving sub-device 502.

In this case, the third optical fiber adapter 701 and the fourth optical fiber adapter 702 are also disposed side by side along the thickness direction of the base 410, and the third optical fiber adapter 701 is connected to the first light-receiving sub-device 501 through the third internal optical fiber 901, so as to implement the reception of the third composite light beam. The fourth optical fiber adapter 702 is connected to the second light-receiving sub-device 502 through the fourth internal optical fiber 902, so as to implement the reception of the fourth composite light beam.

Figure 18C:
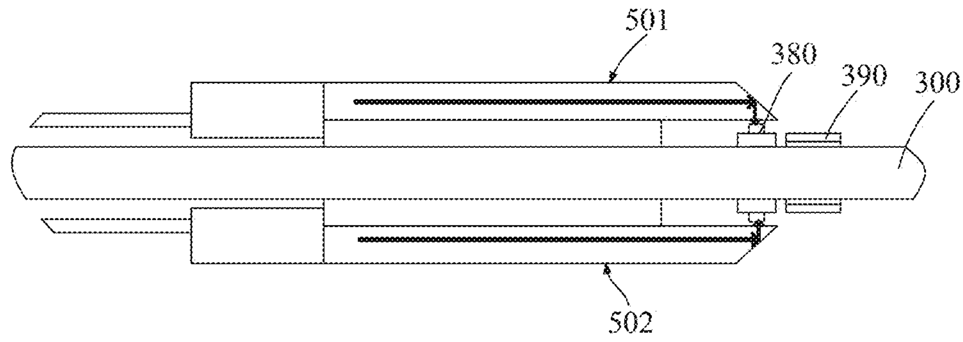
FIG. 18C is a cross-sectional view of a circuit board and a light-receiving device in an optical module, in accordance with some embodiments.

FIG. 18C is a cross-sectional view of a circuit board and a light-receiving device in an optical module, in accordance with some embodiments. As shown in FIG. 18C, the first light-receiving sub-device 501 and the second light-receiving sub-device 502 are disposed opposite to each other on the front surface and the back surface of the circuit board 300. The first light-receiving sub-device 501 disposed on the front surface of the circuit board 300 is connected to the third optical fiber sub-adapter 701 through the third internal optical fiber 901, so that the light beam (e.g., the third composite light beam) from the outside of the optical module 200 is transmitted to the first light-receiving sub-device 501 through the third internal optical fiber 901 and is demultiplexed into four light beams through the wavelength division de-multiplexer 5023. The four light beams (i.e., the optical signals) are reflected by the reflective prism 5025 to the receiving detectors 380 disposed on the front surface of the circuit board 300. In this way, the optical signals are converted into high-frequency current signals by the receiving detectors 380. The high-frequency current signals are transmitted to the transimpedance amplifier 390 and converted into high-frequency voltage signals through the transimpedance amplifier 390 and transmitted to the digital signal processing chip 310. The digital signal processing chip 310 obtains the data of the high-frequency voltage signal.

The second light-receiving sub-device 502 disposed on the back surface of the circuit board 300 is connected to the fourth optical fiber sub-adapter 702 through the fourth internal optical fiber 902, so that the light beam (e.g., the fourth composite light beam) from the outside of the optical module 200 is transmitted to the second light-receiving sub-device 502 through the fourth internal optical fiber 902 and is demultiplexed into four light beams through the wavelength division de-multiplexer 5023. The four light beams (i.e., the optical signals) are reflected by the reflective prism 5025 to the receiving detectors 380 disposed on the back surface of the circuit board 300. The optical signals are converted into high-frequency current signals by the receiving detectors 380. The high-frequency current signals are transmitted to the transimpedance amplifier 390 and converted into high-frequency voltage signals through the transimpedance amplifier 390 and transmitted to the digital signal processing chip 310. The digital signal processing chip 310 obtains the data of the high-frequency voltage signal.

In some embodiments, a via hole is provided at an input pad of the digital signal processing chip 310, and the via hole runs through the front surface and the back surface of the circuit board 300. A high-frequency signal line connected to the input pad of the digital signal processing chip 310 extends to the back surface of the circuit board 300 through the via hole and is connected to the transimpedance amplifier 390 to transmit the high-frequency signal in the circuit board 300 from the front surface of the circuit board 300 to the back surface of the circuit board 300, so that the high-frequency signal is transmitted to the transimpedance amplifier 390 located on the back surface of the circuit board 300.

Figure 19A:
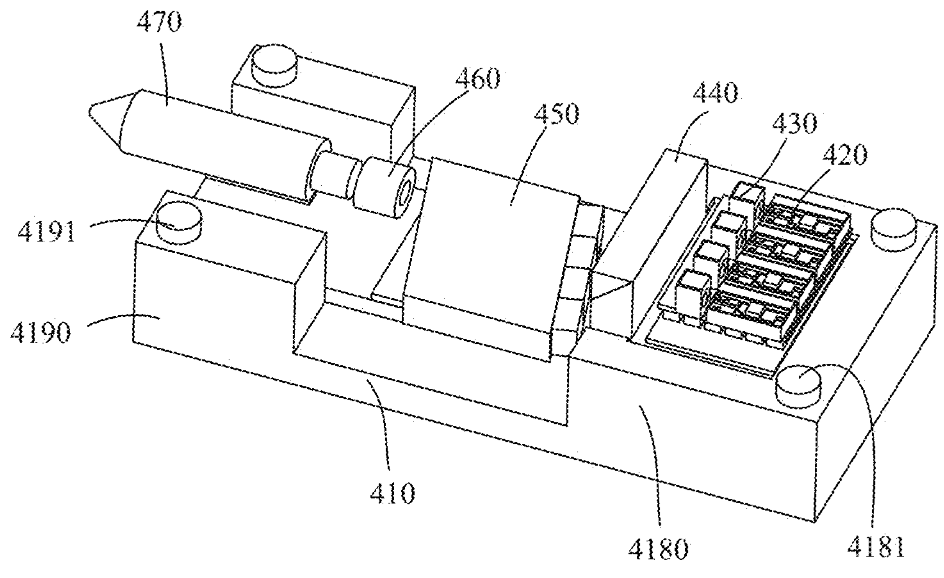
FIG. 19A is a structural diagram of yet another light-emitting device in an optical module, in accordance with some embodiments.
Figure 19B:
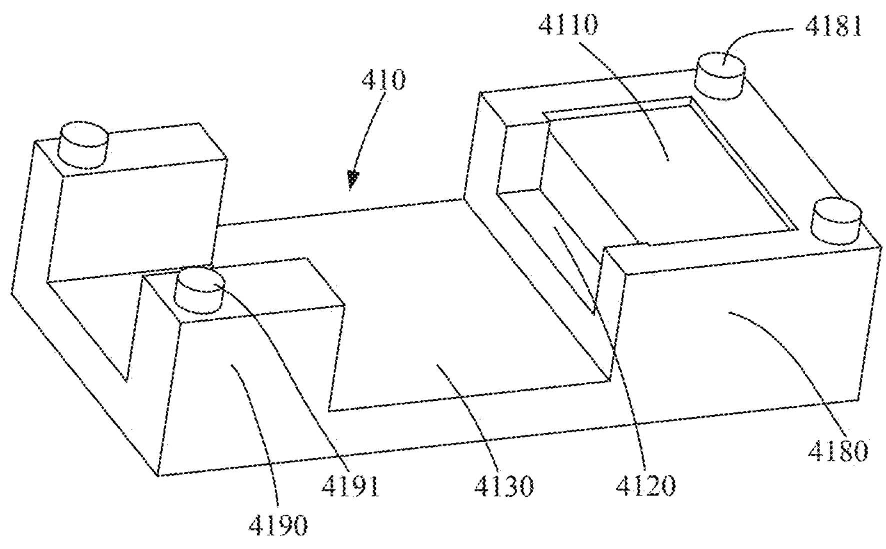
FIG. 19B is a structural diagram of a base in the optical module shown in FIG. 19A.

FIG. 19A is a structural diagram of yet another light-emitting device in an optical module, in accordance with some embodiments; and FIG. 19B is a structural diagram of the base in an optical module shown in FIG. 19A. It will be noted that the above-mentioned light-emitting device 400 and light-receiving device 500 are not only applicable to an 800G optical module, but also applicable to a 400G optical module (i.e., the signal transmission rate of the optical module is 400G bit/s). The 400G optical module encapsulates four optical signal transmission channels in the shell thereof, and a signal transmission rate of each optical signal transmission channel is 100G bit/s. The 400G optical module may implement excellent high-frequency performance, optical performance, and heat dissipation performance in a narrow space, and has low structural complexity and high productivity. Therefore, the 400G optical module may implement mass production and cost reduction.

As shown in FIGS. 19A and 19B, in some embodiments, a light-emitting device 400 of the 400G optical module includes a thermo electric cooler 480, four lasers 420, four first collimating lenses 430, a translation prism 440, a wavelength division multiplexer 450, an optical isolator 460, and an optical fiber coupler 470. It will be noted that the number of wavelength division multiplexers 450, optical isolators 460, and optical fiber couplers 470 is an example and does not constitute a limitation on the present disclosure.

The four lasers 420 are disposed corresponding to the four first collimating lenses 430, each laser 420 emits a laser beam, and each first collimating lens 430 converts a laser beam into a collimated light beam. A collimated light beam exited from the first collimating lens 430 is transmitted to the translation prism 440, and the collimated light beam is reflected by the translation prism 440, so as to change the transmission direction of the collimated light beam.

The light-emitting device 400 is reversely installed on the front surface of the circuit board 300. The thermo electric cooler 480 is fixed on the base 410, and the four lasers 420 and the four first collimating lenses 430 are fixed on the thermo electric cooler 480 and are located at the back side of the circuit board 300 through the mounting hole 320. A first portion of the translation prism 440 is located at the back side of the circuit board 300 through the mounting hole 320, and a second portion of the translation prism 440 is located at the front side of the circuit board 300. The wavelength division multiplexer 450, the optical isolator 460, and the optical fiber coupler 470 are located at the front side of the circuit board 300 separately.

In some embodiments, the first portion of the translation prism 440 may be located in the mounting hole 320.

The four lasers 420 emit four laser beams respectively, and the four laser beams are parallel to the back surface of the circuit board 300. The four first collimating lenses 430 convert the four laser beams into four collimated light beams, respectively, and transmit the four collimated light beams to the translation prism 440. The translation prism 440 reflects the four collimated light beams located at the back side of the circuit board 300 to the front side of the circuit board 300.

The base 410 has a boss 4180 extending from the third installation surface 4130 to the direction away from the bottom surface of the base 410. The first installation surface 4110 and the second installation surface 4120 are disposed on the boss 4180.

In some embodiments, the first installation surface 4110 is recessed from a surface of the boss 4180 away from the bottom surface of the base 410 towards the bottom surface of the base 410, so as to facilitate fixing the thermo electric cooler 480 on the first installation surface 4110 and installing the lasers 420 on the thermo electric cooler 480.

The second installation surface 4120 is recessed from the surface of the boss 4180 away from the bottom surface of the base 410 towards the bottom surface of the base 410 and is closer to the bottom surface of the base 410 than the first installation surface 4110, so as to facilitate fixing the translation prism 440 on the second installation surface 4120. The first reflective surface 441 of the translation prism 440 is away from the second installation surface 4120 and is proximate to the laser 420, and the second reflective surface 442 of the translation prism 440 is proximate to the second installation surface 4120. In this way, the laser beams located at the back side of the circuit board 300 are reflected to the front side of the circuit board 300 by the translation prism 440.

The wavelength division multiplexer 450, the optical isolator 460, and the optical fiber coupler 470 are disposed on the third installation surface 4130 in sequence.

In some embodiments, in the predetermined direction, the dimension of the first installation surface 4110 is slightly greater than the dimension of the second installation surface 4120, so as to facilitate the arrangement of the four lasers 420 side by side on the first installation surface 4110 along the direction. The dimension of the third installation surface 4130 is substantially equal to the dimension of the boss 4180. In order to match the four lasers 420 on the first installation surface 4110, the dimension of the wavelength division multiplexer 450 is less than the dimension of the third installation surface 4130.

In some embodiments, the base 410 further includes two third supporting columns 4190 proximate to the end of the third installation surface 4130 away from the second installation surface 4120. There is an opening between the two third supporting columns 4190, through which the optical fiber coupler 470 is connected to the corresponding optical fiber adapter. In the predetermined direction, a distance between the two third supporting columns 4190 is less than or equal to the dimension of the third installation surface 4130. For example, two side surfaces facing away from each other of the two third supporting column 4190 are flush with the side surfaces of the base 410.

The third supporting column 4190 extends from the third installation surface 4130 to the direction away from the bottom surface of the base 410. The base 410 further includes two third positioning pins 4191 respectively located on end surfaces of the two third supporting columns 4190 facing away from the bottom surface of the base 410. The third positioning pins 4191 are disposed corresponding to the first positioning holes 360 (see FIG. 8) in the circuit board 300.

In order to facilitate installing the base 410 on the circuit board 300, the base 410 further includes two fourth positioning pins 4181. The two fourth positioning pins 4181 are located on end surface of the boss 4180 facing away from the bottom surface of the base 410. The fourth positioning pins 4181 are disposed corresponding to the second positioning holes 370 (see FIG. 8) in the circuit board 300.

In a case where the base 410 is reversely installed on the circuit board 300, the boss 4180 and the two third supporting columns 4190 of the base 410 are in contact with the front surface of the circuit board 300. The two fourth positioning pins on the boss 4180 are inserted into the two second positioning holes 370 in the circuit board 300, respectively, and the two third positioning pins 4191 on the two third supporting columns 4190 are inserted into the two first positioning holes 360 in the circuit board 300, respectively.

Figure 20A:
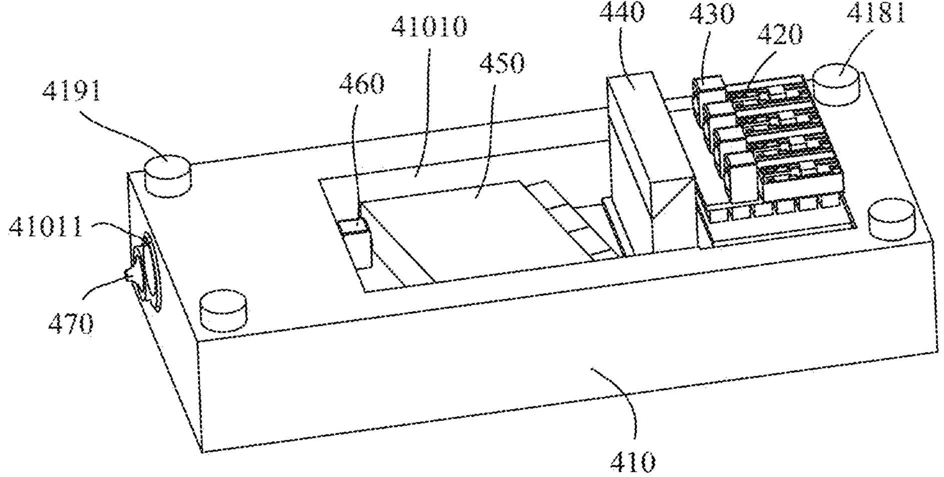
FIG. 20A is a structural diagram of yet another light-emitting device in an optical module, in accordance with some embodiments.
Figure 20B:
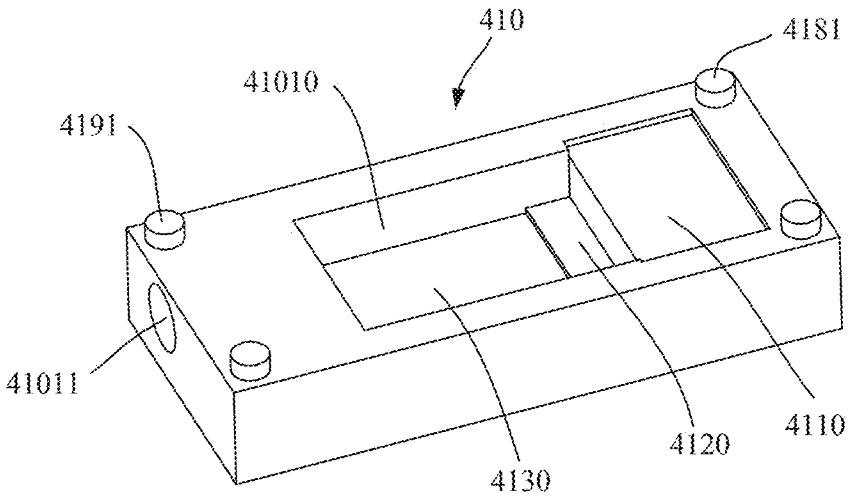
FIG. 20B is a structural diagram of a base in the optical module shown in FIG. 20A.

FIG. 20A is a structural diagram of yet another light-emitting device in an optical module, in accordance with some embodiments; and FIG. 20B is a structural diagram of a base in the optical module shown in FIG. 20A. As shown in FIGS. 20A and 20B, the base 410 is a square base including a groove 41010. The groove 41010 is recessed towards the bottom surface of the base 410, so as to form the first installation surface 4110, the second installation surface 4120, and the third installation surface 4130. The base 410 further includes a fixing hole 41011. The fixing hole 41011 extends towards the optical fiber adapter and runs through a side wall of the groove 41010. The optical fiber coupler 470 is inserted into the fixing hole 41011.

The thermo electric cooler 480 is disposed on the first installation surface 4110 in the groove 41010. The four lasers 420 are disposed on the thermo electric cooler 480, the four first collimating lenses 430 corresponding to the four lasers 420 are also disposed on the thermo electric cooler 480, and the first collimating lenses 430 are disposed in the light-emitting directions of the lasers 420.

The translation prism 440 is disposed on the second installation surface 4120 in the groove 41010. The first reflective surface 441 of the translation prism 440 is away from the second installation surface 4120 and proximate to the laser 420. The second reflective surface 442 of the translation prism 440 is proximate to the second installation surface 4120. In this way, the translation prism 440 may reflect the laser beam at the back side of the circuit board 300 to the front side of the circuit board 300.

The wavelength division multiplexer 450 and the optical isolator 460 are disposed on the third installation surface 4130 in the groove 41010 in sequence. The four laser beams reflected by the translation prism 440 are combined into a composite light beam through the wavelength division multiplexer 450, and the composite light beam passes through the optical isolator 460 and is incident on the optical fiber coupler 470, so as to implement the emission of light.

In some embodiments, in the predetermined direction, the dimension of the first installation surface 4110 is slightly greater than the dimension of the second installation surface 4120, so as to facilitate the arrangement of the four lasers 420 side by side on the first installation surface 4110 along the direction. The dimension of the third installation surface 4130 is substantially equal to the dimension of the second installation surface 4120. In the light-emitting direction of the laser 420, the dimensions of the base 410 are substantially equal to each other in the predetermined direction.

In the predetermined direction, the dimension of the third installation surface 4130 is equal to the dimension of the groove 41010, and the wavelength division multiplexer 450 is embedded in the groove 41010. Therefore, the dimensions of the wavelength division multiplexer 450 in the predetermined direction may be equal to the dimensions of the third installation surface 4130 in this direction.

Some embodiments of the present disclosure further provide another optical module 200. The optical module 200 includes a shell, a circuit board 300, a plurality of laser assemblies 420, a translation prism 440, a wavelength division multiplexer 450, and an optical fiber coupler 470. The shell includes an upper shell 201 and a lower shell 202. The circuit board 300 is located between the upper shell 201 and the lower shell 202, and the circuit board 300 has a front surface facing towards the upper shell 201 and a back surface facing towards the lower shell 202.

The circuit board 300 includes a mounting hole 320 running through the front surface and the back surface of the circuit board 300. The plurality of laser assemblies 420 are located in the mounting hole 320. The plurality of laser assemblies 420 are configured to emit a plurality of laser beams. At least one of the plurality of laser assemblies 420 includes a pad. The pad is flush with the back surface of the circuit board 300.

A first portion of the translation prism 440 is located in the mounting hole 320, and a second portion of the translation prism 440 protrudes from the front surface of the circuit board 300. The translation prism 440 is configured to translate the plurality of laser beams to a front side of the circuit board 300.

The wavelength division multiplexer 450 is located at the front side of the circuit board 300 and is configured to combine the plurality of laser beams translated by the translation prism 440 into a composite light beam. The optical fiber coupler 470 is configured to transmit the composite light beam to the outside of the optical module 200.

In some embodiments, the circuit board 300 further includes a digital signal processing chip 310, a plurality of via holes 340, and a plurality of high-frequency signal lines 330. The digital signal processing chip 310 is fixed on the front surface of the circuit board 300 and is located at a side of the mounting hole 320. The digital signal processing chip 310 includes a plurality of output pads. The plurality of via holes 340 are located at the plurality of output pads and run through the front surface and the back surface of the circuit board 300. The plurality of high-frequency signal lines 330 are located on the back surface of the circuit board 300 and are substantially flush with the pad of the laser assembly 420. Ends of the plurality of high-frequency signal lines 330 are electrically connected to the plurality of output pads through the plurality of via holes 340, and the another ends of the plurality of high-frequency signal lines 330 are connected to the pads of the plurality of laser assemblies 420 through wire bonding. In this way, the interference between the high-frequency signal line 330 and the components disposed on the front surface of the circuit board 300 may be avoided. In addition, a length of the high-frequency signal line 330 may be shortened, and a height that the high-frequency signal line 330 spans when electrically connected to the pad of the laser 420 may be reduced, thereby improving the transmission performance of the high-frequency signal.

It will be noted that the "flush" or "substantially flush" mentioned above means that a component is located in a plane where another component is located. Alternatively, a distance between the component and the plane where the other component is located is less than a predetermined distance.

In some embodiments, the optical module 200 further includes a base 410 installed on the front surface of the circuit board 300, and the base 410 has an installation surface 4130. The installation surface 4130 faces towards the front surface of the circuit board 300. The plurality of laser assemblies 420, the translation prism 440, the wavelength division multiplexer 450, and the optical fiber coupler 470 are disposed on the installation surface 4130.

In the optical module provided by some embodiments of the present disclosure, the light-emitting device 400 is reversely installed on the circuit board 300, so that the spacer 422 in the laser 420 is flush with the back surface of the circuit board 300. Therefore, the connecting wire between the ground wire and the signal line on the spacer 422 and the circuit wiring on the back surface of the circuit board 300 is minimized, so as to ensure the excellent high-frequency signal transmission performance. In addition, such arrangement may also reduce the size of the mounting hole 320 of the circuit board 300, so as to increase a layout area of electronic elements of the circuit board 300.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. An optical module, comprising:

a shell including an upper shell and a lower shell;

a circuit board located between the upper shell and the lower shell; the circuit board having a front surface facing towards the upper shell and a back surface facing towards the lower shell; the circuit board including a mounting hole run through the front surface and the back surface; and a light-emitting device installed on the circuit board, and including:

a base installed on the front surface of the circuit board, and the base having an installation surface and a bottom surface opposite to the installation surface; the installation surface facing towards the front surface, and the bottom surface facing towards the upper shell;

a laser assembly installed on the installation surface and running through the mounting hole;

a translation prism installed on the installation surface and running through the mounting hole, so that a first portion of the translation prism is located at a back side of the circuit board, and a second portion of the translation prism is located at a front side of the circuit board; the translation prism being configured to translate a laser beam located at the back side of the circuit board emitted by the laser assembly to the front side of the circuit board; and at least one optical fiber coupler configured to transmit the laser beam translated by the translation prism to the front side of the circuit board to an outside of the optical module.

2. The optical module according to claim 1, wherein the translation prism includes:

a first reflective surface being away from the installation surface and facing towards the laser assembly; the first reflective surface being configured to reflect the laser beam emitted by the laser assembly parallel to the back surface of the circuit board, so that the laser beam propagates in a direction perpendicular to both the front surface and the back surface of the circuit board; and a second reflective surface being proximate to the installation surface and facing towards the at least one optical fiber coupler; the second reflective surface being configured to reflect the laser beam perpendicular to both the front surface and the back surface of the circuit board, so that the laser beam propagates in a direction parallel to the front surface of the circuit board.

3. The optical module according to claim 1, wherein the installation surface of the base includes:

a first installation surface, and the laser assembly being installed on the first installation surface;

a second installation surface recessed from the first installation surface towards the bottom surface of the base, and the translation prism being installed on the second installation surface; and a third installation surface recessed from the second installation surface towards the bottom surface of the base, and the at least one optical fiber coupler being installed on the third installation surface.

4. The optical module according to claim 1, wherein the light-emitting device includes a plurality of laser assemblies, and each laser assembly emits a laser beam; the plurality of laser assemblies are disposed side by side in a predetermined direction; wherein the predetermined direction is a direction perpendicular to light-emitting directions of the plurality of laser assemblies and parallel to the front surface of the circuit board; and the light-emitting device further includes at least one wavelength division multiplexer; the at least one wavelength division multiplexer is installed on the installation surface of the base and located between the translation prism and the at least one optical fiber coupler; the at least one wavelength division multiplexer is configured to combine a plurality of laser beams reflected by the translation prism into at least one composite light beam and transmit the at least one composite light beam to the at least one optical fiber coupler.

5. The optical module according to claim 4, wherein the plurality of laser assemblies are configured to emit a plurality of laser beams with different wavelengths; the at least one wavelength division multiplexer includes:

a first wavelength division multiplexer configured to combine a part of the plurality of laser beams reflected by the translation prism into a first composite light beam; and a second wavelength division multiplexer disposed side by side with the first wavelength division multiplexer in the predetermined direction and configured to combine another part of the plurality of laser beams reflected by the translation prism into a second composite light beam;

wherein the at least one optical fiber coupler includes:

a first optical fiber coupler optically coupled to the first wavelength division multiplexer and configured to couple the first composite light beam to a first optical fiber sub-adapter through a first internal sub-optical fiber; and a second optical fiber coupler optically coupled to the second wavelength division multiplexer and disposed side by side with the first optical fiber coupler in the predetermined direction; the second optical fiber coupler being configured to couple the second composite light beam to a second optical fiber sub-adapter through a second internal sub-optical fiber.

6. The optical module according to claim 4, wherein the plurality of laser assemblies include at least one first laser assembly and at least one second laser assembly;

in the light-emitting directions of the plurality of laser assemblies, a length of the first laser assembly extending from a side of the base proximate to the plurality of laser assemblies is less than a length of the second laser assembly extending from a same side of the base; and in the predetermined direction, the first laser assembly and the second laser assembly are spaced apart and disposed side by side.

7. The optical module according to claim 1, wherein the laser assembly includes a laser chip and a spacer carrying the laser chip; the light-emitting device is installed on the front surface of the circuit board, and the spacer is flush with the back surface of the circuit board.

8. The optical module according to claim 7, wherein the circuit board further includes:

a digital signal processing chip fixed on the front surface of the circuit board and located at a side of the mounting hole;

a via hole located at an output pad of the digital signal processing chip and running through the front surface and the back surface of the circuit board; and a high-frequency signal line located in the via hole; an end of the high-frequency signal line being electrically connected to the output pad of the digital signal processing chip through the via hole, and another end of the high-frequency signal line being electrically connected to the laser assembly along the back surface of the circuit board.

9. The optical module according to claim 8, wherein the circuit board further includes a direct current signal line located on the back surface of the circuit board and being electrically connected to the laser assembly; and wherein the direct current signal line and the high-frequency signal line are located at different sides of the mounting hole.

10. The optical module according to claim 8, wherein the circuit board further includes a photodetector disposed on the back surface of the circuit board, and located at a side of the mounting hole away from the digital signal processing chip; a photosensitive surface of the photodetector faces towards a light-emitting direction of the laser assembly; and a portion of the laser beam emitted by the laser assembly transmits through the translation prism and is incident on the photosensitive surface of the photodetector, so that the photodetector is capable of monitoring a transmitting optical power of the laser assembly.

11. The optical module according to claim 1, further comprising a light-receiving device including a first light-receiving sub-device and a second light-receiving sub-device;

wherein a third internal sub-optical fiber connected to a third optical fiber sub-adapter transmits a third composite light beam from the outside of the optical module to the first light-receiving sub-device, and a fourth internal sub-optical fiber connected to a fourth optical fiber sub-adapter transmits a fourth composite light beam from the outside of the optical module to the second light-receiving sub-device; and any one of the first light-receiving sub-device and the second light-receiving sub-device includes a wavelength division de-multiplexer; the wavelength division de-multiplexer being configured to demultiplex the third composite light beam or the fourth composite light beam into a plurality of laser beams and transmit the plurality of laser beams to a receiving detector on the circuit board.

12. The optical module according to claim 11, wherein the first light-receiving sub-device and the second light-receiving sub-device satisfy one of the following:

the first light-receiving sub-device and the second light-receiving sub-device are installed on the front surface of the circuit board and located at two sides of the light-emitting device respectively in a predetermined direction; and the first light-receiving sub-device is installed on the front surface of the circuit board, and the second light-receiving sub-device is installed on the back surface of the circuit board.

13. The optical module according to claim 1, wherein the bottom surface of the base is in thermal conductive contact with the upper shell.

14. The optical module according to claim 1, wherein the base further satisfies one of the following:

the base further includes a first supporting column and a first positioning pin; and the base further includes a second supporting column and a second positioning pin;

wherein the first supporting column is located at an end of the installation surface of the base away from the laser assembly and extends in a direction away from the bottom surface of the base; the first positioning pin is located on an end surface of the first supporting column away from the bottom surface of the base;

the second supporting column is located at the end of the installation surface of the base away from the laser assembly and extends in the direction away from the bottom surface of the base; the second positioning pin is located on an end surface of the second supporting column away from the bottom surface of the base; and the circuit board further includes a first positioning hole disposed corresponding to the first positioning pin or the second positioning pin.

15. The optical module according to claim 14, wherein the base satisfies one of the following:

the base includes two first supporting columns, and an opening is provided between the two first supporting columns; an internal optical fiber connected to the at least one optical fiber coupler is connected to an optical fiber adapter through the opening; a distance between the two first supporting columns in a predetermined direction is less than or equal to a dimension of the base in the direction, so that side surfaces of the two first supporting columns facing away from each other are flush with corresponding side surfaces of the base; and the base includes two second supporting columns, and an opening is provided between the two second supporting columns; the internal optical fiber connected to the at least one optical fiber coupler is connected to the optical fiber adapter through the opening; a distance between the two first supporting columns in the predetermined direction is greater than the dimension of the base in the direction.

16. The optical module according to claim 14, wherein the base further includes:

a positioning block located at an end of the installation surface of the base proximate to the laser assembly and extending in the direction away from the bottom surface of the base; and a positioning protrusion located on an end surface of the positioning block away from the bottom surface of the base;

wherein the circuit board further includes a second positioning hole disposed corresponding to the positioning protrusion.

17. The optical module according to claim 1, wherein the base and the circuit board satisfy one of the following:

the base further includes:

a supporting block located at an end of the installation surface of the base away from the laser assembly and extending in a direction away from the bottom surface of the base;

a through hole running through the supporting block, and the at least one optical fiber coupler being inserted into the through hole;

a positioning block located at the end of the installation surface of the base proximate to the laser assembly and extending in the direction away from the bottom surface of the base; and a positioning protrusion located on an end surface of the positioning block away from the bottom surface of the base;

wherein the circuit board further includes a second positioning hole disposed corresponding to the positioning protrusion;

or, the base further includes:

a third supporting column located at the end of the installation surface of the base away from the laser assembly and extending in the direction away from the bottom surface of the base;

a third positioning pin located on an end surface of the third supporting column away from the bottom surface of the base;

a boss located at an end of the installation surface of the base proximate to the laser assembly and extending in the direction away from the bottom surface of the base; and a fourth positioning pin located on an end surface of the boss away from the bottom surface of the base;

wherein the circuit board further includes:

a first positioning hole disposed corresponding to the third positioning pin; and a second positioning hole disposed corresponding to the fourth positioning pin;

or, the base further includes:

a groove recessed towards the bottom surface of the base;

a fixing hole running through a side wall of the groove, and the at least one optical fiber coupler being inserted into the fixing hole;

a third positioning pin located on an end surface of the groove away from the bottom surface of the base and proximate to the fixing hole; and a fourth positioning pin located on the end surface of the groove away from the bottom surface of the base and proximate to the laser assembly;

wherein the circuit board further includes:

the first positioning hole disposed corresponding to the third positioning pin; and the second positioning hole disposed corresponding to the fourth positioning pin.

18. The optical module according to claim 1, wherein the optical module satisfies one of the following:

the optical module is an optical module with a signal transmission rate of 800G bit/s; and the optical module is an optical module with a signal transmission rate of 400G bit/s.

* * * * *